United States Patent
Tomioka

(10) Patent No.: US 8,400,699 B2
(45) Date of Patent: Mar. 19, 2013

(54) OPTICAL SCANNING DEVICE AND IMAGE FORMING APPARATUS USING THE SAME

(75) Inventor: Yuichi Tomioka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 12/268,913

(22) Filed: Nov. 11, 2008

(65) Prior Publication Data

US 2009/0122378 A1 May 14, 2009

(30) Foreign Application Priority Data

Nov. 14, 2007 (JP) ................. 2007-295346

(51) Int. Cl.
*G02B 26/08* (2006.01)
(52) U.S. Cl. ............. 359/205.1; 359/207.2
(58) Field of Classification Search .... 359/205.1–207.6, 359/662; 347/243–244, 258–261
See application file for complete search history.

(56) References Cited

U.S. PATENT DOCUMENTS

| 5,966,161 | A | 10/1999 | Kato | 347/258 |
|---|---|---|---|---|
| 6,388,792 | B1 | 5/2002 | Atsuumi et al. | 359/207 |
| 6,512,623 | B1 * | 1/2003 | Ishihara | 359/207.1 |
| 7,142,339 | B2 | 11/2006 | Tomioka | 359/204 |
| 2004/0104994 | A1 | 6/2004 | Ishihara et al. | 347/258 |
| 2007/0091402 | A1 | 4/2007 | Tomioka | 359/201 |
| 2008/0298839 | A1 | 12/2008 | Tomioka | 399/151 |

FOREIGN PATENT DOCUMENTS

| JP | 2000-098288 | 4/2000 |
|---|---|---|
| JP | 2001-021824 | 1/2001 |
| JP | 3252708 B2 | 2/2002 |
| JP | 2003-094441 | 4/2003 |
| JP | 2004-070109 | 3/2004 |
| JP | 2004-151387 | 5/2004 |
| JP | 2004-198894 | 7/2004 |
| JP | 2006-064876 | 3/2006 |

OTHER PUBLICATIONS

U.S. Appl. No. 12/268,781, filed Nov. 11, 2008 by Ken Tanimura.
Japanese Notification of Ground of Rejection dated Jan. 27, 2012 in counterpart Japanese Application No. 2007-295346, and English language translation thereof.

* cited by examiner

*Primary Examiner* — James Phan
(74) *Attorney, Agent, or Firm* — Fitzpatrick, Cella, Harper & Scinto

(57) ABSTRACT

An optical scanning device includes a light source device, a deflector, an input optical system for directing a light beam from the light source device onto the deflector, and an imaging optical system for imaging a light beam scanningly deflected by a deflecting surface of the deflector, upon a scan surface to be scanned, wherein, in a sub-scan section, a light beam directed from the input optical system toward the deflecting surface of the deflector is incident thereon at a finite angle with respect to a plane which is orthogonal to a rotational axis of the deflector, wherein the imaging optical system includes at least one molded imaging lens, and wherein a shape within a sagittal section of at least one lens surface, of lens surfaces of the at least one imaging lens, is non-arcuate, and a sagittal curvature in a light beam passage region has an extreme value.

10 Claims, 18 Drawing Sheets

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is particularly suitably usable in an image forming apparatus such as a laser beam printer (LBP), a digital copying machine or a multifunction printer, for example, having an electrophotographic process.

In recent years, with regard to the image forming apparatus such as a laser beam printer, a digital copying machine or a multifunction printer, enhancement of the picture quality of the image has been desired. For higher picture quality, it is necessary to correct the scan line curve and the image plane deviation satisfactorily.

The scan line curve is a phenomenon that in a sub-scan oblique incidence optical system the locus of a light spot scanning a photosensitive member (photosensitive drum surface) is curved. On the other hand, the image plane deviation is a phenomenon that the focus of the light spot imaged on the photosensitive member is deviated. The state in which the image plane deviation amount differs with the image height is called "field curvature".

Conventionally, a variety of proposals have been made with regard to optical scanning devices attempting the correction of the scan line curve and the image plane deviation, to enhance the picture quality of the image (see patent documents Nos. 1-4).

In patent document No. 1, to correct the scan line curve, the lens surfaces of imaging lenses corresponding to a plurality of photosensitive drums, for imaging light spots on these photosensitive drums are comprised of tilt surfaces of special shape in which the surface tilt amount in the sub-scan direction changes relative to the main-scan direction.

Patent document No. 2 discloses a method of correcting a mirror surface piece of a lens injection molding in an imaging optical system.

In patent document No. 2, a lens injection-molded is placed within an optical system equivalent to one to be used practically, and the image plane deviation and the scan line curve are measured. The lens surface is made into a non-arcuate shape in sub-scan direction to cancel these measured values.

Here, in patent document No. 2, to correct the scan line curve and the image plane deviation, the surface tilt in the sagittal direction (a coefficient of a linear function presented in terms of the sag amount=AZ from the arc) is given as an adjusting value to the mirror surface piece processing value.

Furthermore, a secondary component in the sagittal direction (a coefficient of a quadratic function presented in terms of the sag amount=$BZ^2$ from the arc) is given as an adjusting value.

Patent document No. 3 discloses a method of correcting the image plane deviation in the sub-scan direction, caused by an internal strain of an injection-molded lens (corresponding to the refractive index gradient in patent document No. 3). In order to correct this image plane deviation in patent document No. 3, the focal length as calculated from the optical disposition, the thickness of the optic members, the refractive index of the materials, and the sagittal curvature of the lens surface, is set to be shorter than the actually measured focal length.

For example, by deviating the sagittal curvature of the imaging lens from a design value (more specifically, by making the power positive), the image plane deviation (deviation in the direction apart from the deflecting means) in the sub-scan direction due to the refractive index gradient of the imaging lens is cancelled.

Patent document No. 4 shows that the lens surface of an imaging lens is made into a sagittal non-arcuate shape to correct the wavefront aberration.

In the scanning optical system, the major factor that degrades the wavefront aberration in the sub-scan direction is the spherical aberration produced in a collimator lens, a cylindrical lens and an imaging lens.

In patent document No. 4, the spherical aberration is corrected by introducing a non-arcuate shape surface at the convex surface of the imaging lens in the sagittal direction, in which non-arcuate surface the surface shape gradually changes from a convex shape to a concave shape in the direction from the optical axis to the lens peripheral edge.

The non-arcuate shape around the optical axis of the imaging lens as described in which, from the lens center toward the lens peripheral edge, the surface shape gradually change from a convex shape to a concave shape, is quite usual as a non-arcuate shape for correcting the spherical aberration.

[Patent Documents]
1. Japanese Laid-Open Patent Application No. 2006-64876
2. Japanese Laid-Open Patent Application No. 2003-94441
3. Japan Patent No. 3252708
4. Japanese Laid-Open Patent Application No. 2001-021824

SUMMARY OF THE INVENTION

In patent document No. 1, in an attempt to making the optical system compact, the imaging lens is so configured that the light beam (scanning beam) passes through plural regions thereof in sub-scan direction.

As a result, with this imaging optical system, it is difficult to satisfactorily correct the scan line curve with respect to all the light beams.

In patent document No. 1, the sub-scan direction of the imaging lens is shared by a plurality of light beams. Then, to correct the scan line curve for one light beam, the imaging lens is formed with a surface shape which is made asymmetric in the sub-scan direction.

Therefore, there is a problem that the scan line curve of the other light beams is worsened.

The method disclosed in patent document No. 2 involves the following two problems particularly in the case of an optical scanning device (scanning optical system) in which the sub-scan direction of the lens is shared by a plurality of light beams.

A first problem is that, since the imaging lens has a surface shape which is asymmetric in sub-scan direction to correct the scan line curve of certain light beam among a plurality of light beams, the scan line curve of the other light beams is deteriorated.

A second problem is that, in the case of a lens configured so that a light beam passes through a position deviated from the sagittal optical axis (lens center), if a secondary component in the sagittal direction is added to correct the image plane deviation, the surface tilt in the sagittal direction at the light beam passage position changes which, in turn, causes a scan line curve.

Furthermore, since patent document No. 2 does not really disclose specific values of the sagittal non-arcuate shape for the lens surface of the imaging lens, it is practically difficult to correct both of the scan line curve and the image plane deviation using the method disclosed in patent document No. 2.

Patent document No. 4 involves a problem that a good spot is not obtainable in an oblique incidence optical system.

Since in the oblique incidence optical system the scanning light beam being scanningly deflected by the deflecting means performs conical scan, the scanning light beam passes through the position deviated from the sagittal optical axis (lens center) of the imaging lens.

As compared with this, in the imaging lens of the disclosed embodiment of patent document No. 4, the curvature changes around the optical axis from the lens center to the lens peripheral edge.

As a result, when it is used as a lens of an oblique incidence optical system, the curvature thereof in the light passage region of the scanning light beam becomes asymmetric, and comatic aberration is produced thereby.

Consequently, if patent document No. 4 is introduced into an oblique incidence optical system, a good spot is not obtainable upon the scan surface.

Furthermore, patent document No. 4 has an additional problem that the image plane deviation attributable to the refractive index gradient of an oblique incidence optical system can not be corrected.

The image plane deviation resulting from the refractive index gradient of an injection-molded lens is the image plane deviation which is in the direction away from the deflecting means. Thus, a positive power (refracting power) must be provided in the lens to correct this.

In patent document No. 4, however, from the lens optical axis to the lens peripheral edge, that is, at the position where the scanning light beam passes, the power becomes negative as compared with the optical axis. Therefore, the image plane deviation cannot be cancelled, and it cannot be corrected.

In other words, in patent document No. 4, the image plane deviation due to the refractive index gradient cannot be corrected, and a good spot is not obtainable.

The present invention provides an optical scanning device and an image forming apparatus using the same, by which the scan line curve and the image plane deviation can be well corrected or sufficiently reduced.

In accordance with an aspect of the present invention, there is provided an optical scanning device, comprising: light source means; deflecting means; an input optical system configured to direct a light beam from said light source means onto said deflecting means; and an imaging optical system configured to image a light beam scanningly deflected by a deflecting surface of said deflecting means, upon a scan surface to be scanned, wherein, in a sub-scan section, a light beam directed from said input optical system toward the deflecting surface of said deflecting means is incident thereon at a finite angle with respect to a plane which is orthogonal to a rotational axis of said deflecting means, wherein said imaging optical system includes at least one molded imaging lens, and wherein a shape within a sagittal section of at least one lens surface, of lens surfaces of said at least one imaging lens, is non-arcuate, and a sagittal curvature in a light beam passage region has an extreme value.

In one preferred form of this aspect of the present invention, the shape within the sagittal section of at least one surface of the lens surfaces of said imaging lens is such that a local minimum point of the sagittal curvature is located at a lens center, while a local maximum point of the sagittal curvature is located inside the light beam passage region.

The shape within the sagittal section of at least one surface of the lens surfaces of said imaging lens may be such that a local maximum point of the sagittal curvature is located at a lens center, while a local minimum point of the sagittal curvature is located inside the light beam passage region.

When N denotes a value which is obtainable by converting a difference between the sagittal curvature at a passage position of a principal ray of a light beam and the sagittal curvature at a central position of the lens surface, into a Newton number with respect to a 3 mm width, within the sagittal section, the shape of at least one surface of the lens surfaces of said imaging lens in the sagittal section may satisfy a condition $$0.7 < N < 10$$

over the whole region in a main-scan direction in which the light beam passes.

The shape of at least one surface of the lens surfaces of said imaging lens in the sagittal section may be such that the difference between the sagittal curvature at a passage position of a principal ray of the light beam and the sagittal curvature at a central position of the lens surface increases with a distance in a main-scan direction from an optical axis.

The shape of at least one surface of the lens surfaces of said imaging lens in the sagittal section may be such that a central position of the lens surface and a passage position of a principal ray of the light beam are deviated from each other.

At least one surface of the lens surfaces of said imaging lens may be a lens surface closest to the scan surface.

At least one surface of the lens surfaces of said imaging lens may be a lens surface having a largest refracting power in the sub-scan section.

The shape of at least one surface of the lens surfaces of said imaging lens within the sagittal section may have a positive refracting power or a negative refracting power over the whole region in the sagittal section.

In accordance with another aspect of the present invention, there is provided an image forming apparatus, comprising: an optical scanning device as recited above; a photosensitive member disposed at the scan surface to be scanned; a developing device for developing an electrostatic latent image formed on said photosensitive member with a light beam scanningly deflected by said optical scanning device, to produce a toner image; a transferring device for transferring the developed toner image onto a transfer material; and a fixing device for fixing the transferred toner image, on the transfer material.

In accordance with a further aspect of the present invention, there is provided an image forming apparatus, comprising: an optical scanning device as recited above; and a printer controller for converting code data supplied from an outside machine into an imagewise signal and for inputting the imagewise signal into said optical scanning device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
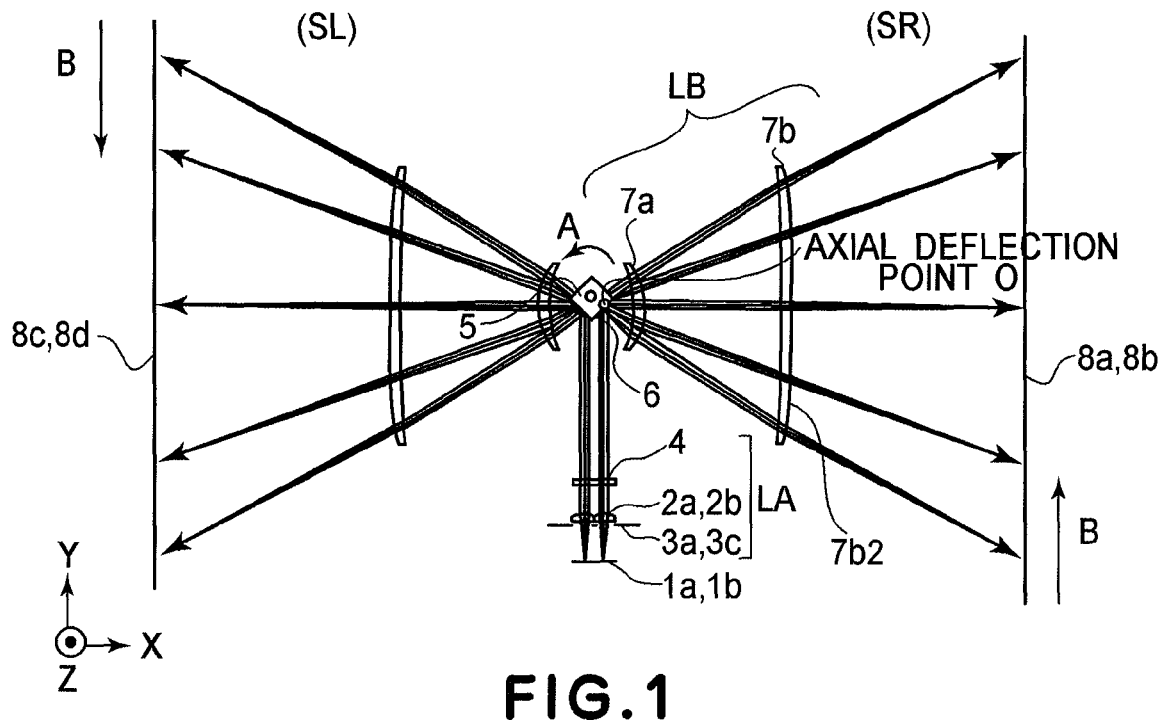
FIG. 1 is a main-scan sectional view of a first embodiment of the present invention.

FIG. 1 is a sectional view along a main-scan direction (main-scan sectional view) of a main portion of a first embodiment of the present invention.

Figure 2A:
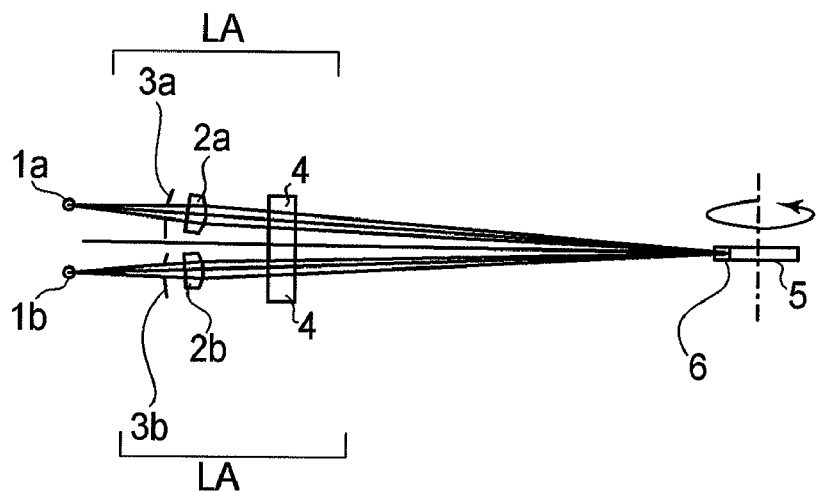
FIG. 2A is a sub-scan sectional view of an input optical system in the first embodiment of the present invention.

FIG. 2A is a sectional view along a sub-scan direction (sub-scan sectional view) of a main portion of an input optical system in the first embodiment of the present invention.

FIG. 2C is a sectional view along a sub-scan direction (sub-scan sectional view) of a main portion of an imaging optical system in the first embodiment of the present invention.

Here, FIG. 1 is a developed illustration for easier understanding of the structure, excluding a reflecting mirror 9 for bending the scanned light beam (light ray) in the sub-scan direction.

In the following description, the term "main-scan direction" refers to a direction in which a light beam is scanningly deflected by a deflecting surface of deflecting means (rotary polygonal mirror).

The term "sub-scan direction" refers to a direction which is parallel to a rotational axis (or oscillation axis) of the deflecting means.

Furthermore, the term "main-scan section" refers to a plane with respect to which the sub-scan direction is a normal.

Furthermore, the term "sub-scan section" refers to a plane with respect to which the main-scan direction is a normal.

Figure 2B:
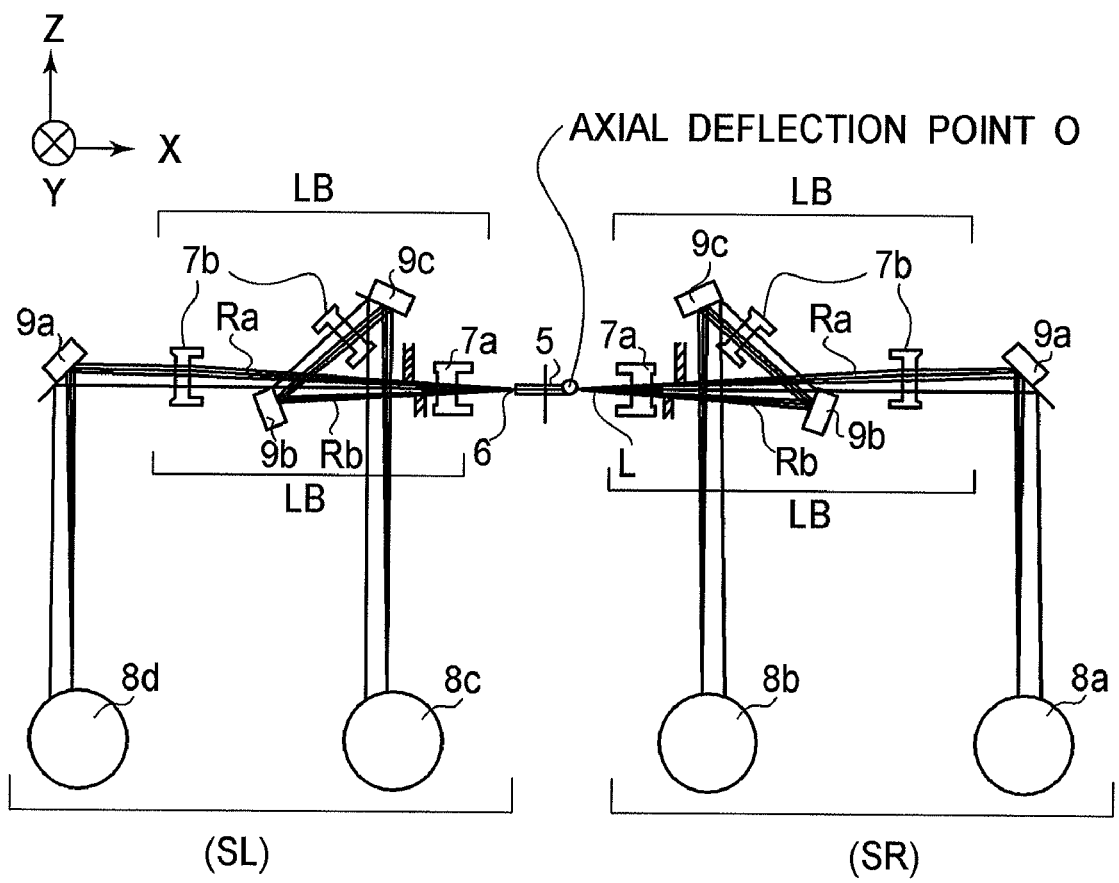
FIG. 2B is a sub-scan sectional view of an imaging optical system in the first embodiment of the present invention.

As shown in FIGS. 1 and 2B, the optical scanning device of the present embodiment comprises two scanning units (scanning optical systems) SR and SL which are disposed to sandwich deflecting means 5 therebetween. More specifically, four light beams are scanningly deflected by single deflecting means 5, thereby to scan associated photosensitive drum surfaces 8.

Since these scanning units SR and SL have the same structure and the same optical function, the following description will be made mainly with regard to the scanning unit SR.

Denoted in the diagrams at 1a and 1b are light source means each comprising a semiconductor laser a having light emitting member (light emission point).

It should be noted that the light source means may comprise either a single or plural light emitting members.

Denoted at 3a and 3b are apertures (aperture stops) which serve to restrict the light beams incident on collimator lenses 2a and 2b, respectively.

Denoted at 2a and 2b are condenser lenses (hereinafter, "collimator lens") which serve to transform the light beams emitted from the light source means 1a and 1b into parallel light beams, respectively.

Denoted at 4 is a cylindrical lens which has a positive power only in the sub-scan section.

It should be noted that the apertures 3a and 3b, collimator lenses 2a and 2b and cylindrical lens 4 are components constituting the input optical system LA.

The input optical system LA of the present embodiment functions so that, as shown in FIG. 2A, the light beams emitted from the light source means 1a and 1b are incident, in the sub-scan section, on the deflecting surface of the deflecting means 5 at a finite angle with respect to a plane (main-scan section) which is perpendicular to the rotational axis of the deflecting means 5.

Hereinafter, this input optical system LA will be called "sub-scan oblique incidence optical system".

It should be noted that, in the present embodiment the collimator lenses 2a and 2b and the cylindrical lens 4 may be constituted by a single optical element (anamorphic lens).

Denoted at 5 is an optical deflector as deflecting means, and it comprises a rotary polygonal mirror (polygon mirror), for example. It rotates in the direction of an arrow A in the drawing, at a constant speed.

Denoted at LB is an imaging optical system which has a light collecting function and an fθ characteristic. It has a positive power (refracting power) in the main-scan section and in the sub-scan section.

Denoted at 8a and 8b are photosensitive drum surfaces (recording medium surfaces) each being a scan surface to be scanned.

Denoted at 9b is a reflecting mirror as light ray separating means. Inside the imaging optical system LB, it functions to separate an upper oblique incidence light beam Ra and a lower oblique incidence light beam Rb, from each other.

Denoted at 9a and 9c are reflecting mirrors for bending the light path.

As best seen in FIG. 2B, the present embodiment uses two imaging optical systems LB (upper imaging optical system and lower imaging optical system) for imaging light beams upon the photosensitive drum surfaces 8a and 8b, respectively.

These imaging optical systems LB function to image, in main-scan section and as a light spot, the light beams based on imagewise information and reflectively deflected by the optical deflector 5, upon the photosensitive drum surfaces 8a and 8b as the scan surfaces.

Furthermore, in the sub-scan section, the imaging optical systems LB function to provide an optically conjugate relationship between the deflecting surface 6 of the optical deflector 5 and the photosensitive drum surfaces 8a and 8b, thereby to accomplish the surface tilt compensation for the deflecting surface.

The imaging optical system LB of the present embodiment comprises at least one molded lens (imaging lens) made of a resin (plastic) and molded by using a lens molding die. In the case of the present embodiment, the imaging optical system LB includes two pieces of first and second imaging lenses 7a and 7b, as the molded lens.

Furthermore, at least one surface of the lens surfaces of at least one molded lens of the imaging optical system LB is configured so that the shape in the sagittal section is non-arcuate and the sagittal curvature in the light beam passage region (in the light ray passage region) has an extreme value.

In this specification, the surface with such shape that the shape in the sagittal section is non-arcuate and the sagittal curvature in the light beam passage region has an extreme value, will be called also "sagittal non-arcuate shape surface".

In the present embodiment, this "sagittal non-arcuate shape surface" is provided at the lens surface which is closest to the scan surface side (namely, at the light exit surface of the second imaging lens 7b).

In the present embodiment, the light beams having been optically modulated in accordance with the imagewise information and emitted from the semiconductor lasers 1a and 1b pass through the aperture stops 3a and 3b (partly shaded thereby), and enter the collimator lenses 2a and 2b.

The light beams incident on the collimator lenses 2a and 2b are converted into parallel light beams, respectively, and these enter the cylindrical lens 4.

The light beams emerging from the cylindrical lens 4 are parallel light beams in the main-scan section. These light beams are then incident on the deflecting surface 6 of the optical deflector 5 as a convergent light beam in the sub-scan section, being converged upon the deflecting surface 6, whereby these are imaged on the deflecting surface 6 of the optical deflector 5 as a line image extending in the main-scan direction.

The light beams scanningly deflected by the deflecting surface 6 of the optical deflector 5 is directed to the photosensitive drum surfaces 8a and 8b, by the imaging optical systems LB.

Then, by rotating the optical deflector 5 in the direction of an arrow A, the photosensitive drum surfaces 8a and 8b are optically scanned in the direction of an arrow B (main-scan direction), whereby imagewise information is recorded thereon.

As best seen in FIG. 2A, the present embodiment uses two, upper and lower input optical systems LA which are disposed up and down as illustrated. These input optical systems LA are configured so that, in the sub-scan section, the light beams from the input optical systems LA are incident on the deflecting surface 6, from obliquely above and from obliquely blow, respectively (i.e., sub-scan oblique incidence optical system).

The two light beams obliquely incident on the deflecting surface 6 are conical-scanned by the optical deflector 5 upwardly and downwardly, respectively. Then, these light beams are separated by the light ray separating means 9b disposed inside the imaging optical system LB, and subsequently these are imaged as a spot on the two different photosensitive drum surfaces 8a and 8b, respectively.

In the present embodiment, as shown in FIG. 2B, a pair of scanning units SR and SL are disposed opposed to each other while sandwiching the optical deflector 5 therebetween. With this arrangement, four photosensitive drum surfaces 8a-8d can be scanned by light spots, respectively.

Furthermore, in the present embodiment, as shown in FIG. 2B, in each of the scanning units SR and SL, the upper light beam (upper oblique incidence light beam) Ra and the lower light beam (lower oblique incidence light beam) Rb pass above and below the optical axis L of the common first imaging lens 7a, respectively.

Also, the first imaging lenses 7a of the scanning units SR and of SL disposed opposed to each other have a mirror-surface coma shape formed by injection molding using the same injection molding die, and these lenses are disposed in a mutually vertically reversed relation between the opposed scanning units SR and SL.

Furthermore, in the present embodiment, in each of the scanning units SR and SL, the second imaging lens 7b for the upper light beam Ra and the second imaging lens 7b for the lower light beam Rb have a mirror-surface coma shape formed by injection molding using the same injection molding die.

Moreover, in the present embodiment, the second imaging lenses 7b of the opposed scanning units SR and SL for the upper light beam and lower light beam have a mirror-surface coma shape formed by injection molding using the same injection molding die. These second imaging lenses are disposed in a mutually vertically reversed relation between the opposed scanning units SR and SL.

Furthermore, the second imaging lenses 7b for the upper light beam and the bottom light beam have their optical axes disposed with an offset of +2.50 mm in the sub-scan direction with respect to the main-scan section which contains a deflection point O on the optical deflector 5, this being done to correct the scan line curve and the wavefront aberration of the spot.

More specifically, if in the scanning unit SR the scanning light beam passes through the region above the sagittal optical axis (lens central portion) of the second imaging lens 7b, then in the scanning unit SL the scanning light beam passes through the region below the sagittal optical axis of the second imaging lens 7b.

Furthermore, in the present embodiment, the opposed scanning units SR and SL perform the optical scan using different deflecting surfaces of the same optical deflector 5.

In the present embodiment as described above, a set of scanning units SR and SL are provided as a sub-scan oblique incidence optical system and disposed opposed to each other. By this, some optical components can be shared and the overall optical scanning device can be made compact.

In the present embodiment as described above, the imaging optical system LB is comprised of two, first and second imaging lenses (molded lenses) 7a and 7b made of a resin and formed by injection molding.

With regard to such imaging lenses made of a resin, internal strain such as refractive index gradients occurs when the lens is injection molded. Thus, if it is used in an imaging optical system, it causes image plane deviation.

Particularly, based on the relationship of the lens thickness, width and height, a deviation of sagittal image surface (image plane deviation in the sub-scan direction) occurs.

Figure 3:
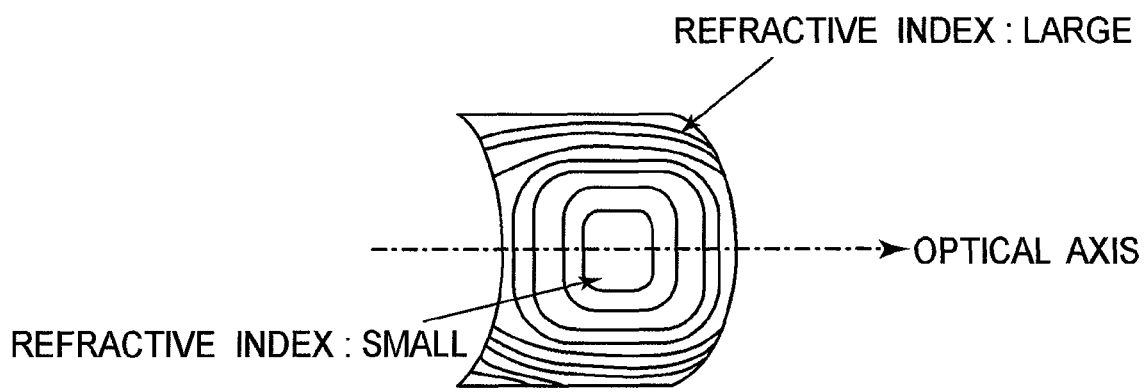
FIG. 3 is a schematic diagram illustrating the refractive index gradient of an injection-molded lens.

FIG. 3 is a schematic diagram illustrating the refractive index distribution of an injection-molded lens in the sub-scan section.

It is seen from FIG. 3 that this injection-molded lens (molded lens) has such refractive index gradient that the refractive index increases from the optical axis toward the lens peripheral edge, in the sub-scan direction.

As a result of this, the sub-scan direction focal length of a lens practically injection molded becomes longer than the focal length in the sub-scan direction of a design value as calculated from the lens sagittal shape, thickness and the refractive index of the glass material.

In the present embodiment, the first and second imaging lenses 7a and 7b of the imaging optical system LB have a refractive index gradient as described above. Therefore, even if the sagittal shape and the lens thickness are exactly equal to the design values, the image plane in the sub-scan direction upon the scan surface will deviate in the direction apart from the optical deflector 5.

Figure 4A:
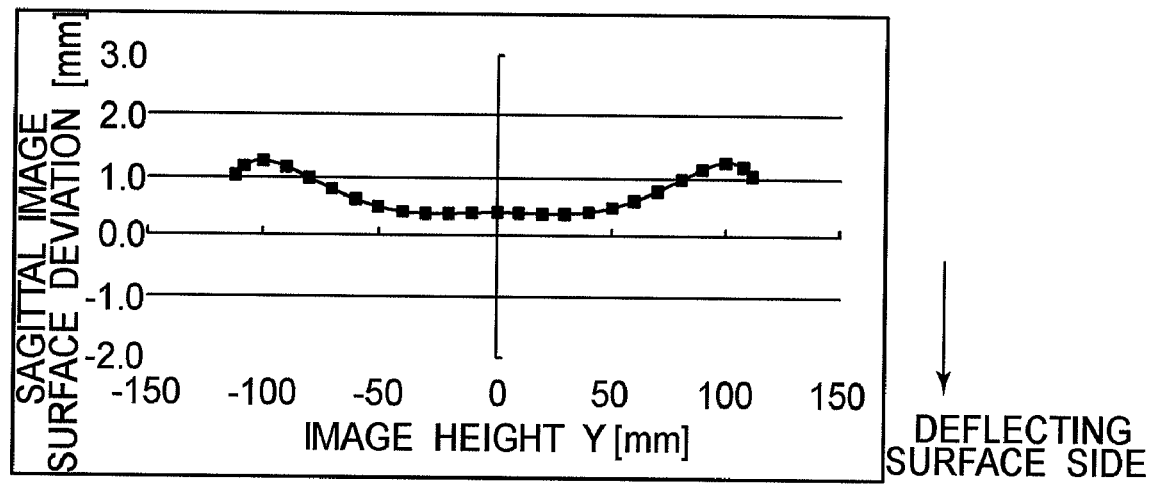
FIG. 4A is a graph illustrating the image plane deviation (before correction) in the sub-scan direction, of a comparative example.

FIG. 4A shows the imaging performance (image plane deviation in the sub-scan direction) based on an imaging lens, before the application of an imaging lens of the present embodiment having a shape to be described later.

FIG. 4 is a graph illustrating the amount of deviation from a design value of the image plane in the sub-scan direction, caused by the refractive index gradient of the first and second imaging lenses 7a and 7b.

It is seen from FIG. 4A that, due to the refractive index gradient of the first and second imaging lenses 7a and 7b, the image plane in the sub-scan direction upon the scan surface deviates in the direction away from the optical deflector 5.

Furthermore, since the refractive index distribution varies with the lens thickness and lens height, it is different at different image heights. Furthermore, if a sub-scan oblique incidence optical system is used, the height in the sub-scan direction whereat the scanning light beam passes through the first and second imaging lenses 7a and 7b changes with the image height.

Because of these factors, as shown in FIG. 4A, the image plane in the sub-scan direction deviates in the direction away from the optical deflector 5 as the image height shifts from the central image height to the peripheral image height. Namely, the field curvature in the sub-scan direction occurs.

With regard to the amount of deviation, it is seen from FIG. 4A that the field curvature in the sub-scan direction is 0.9 mm, and the amount of image plane deviation offset (deviation amount at the central image height) is +0.4 mm.

Conventionally, a generally known method of correcting the image plane deviation in the sub-scan direction is the correction by changing the curvature radius of an arc in the sub-scan direction.

Figure 11:
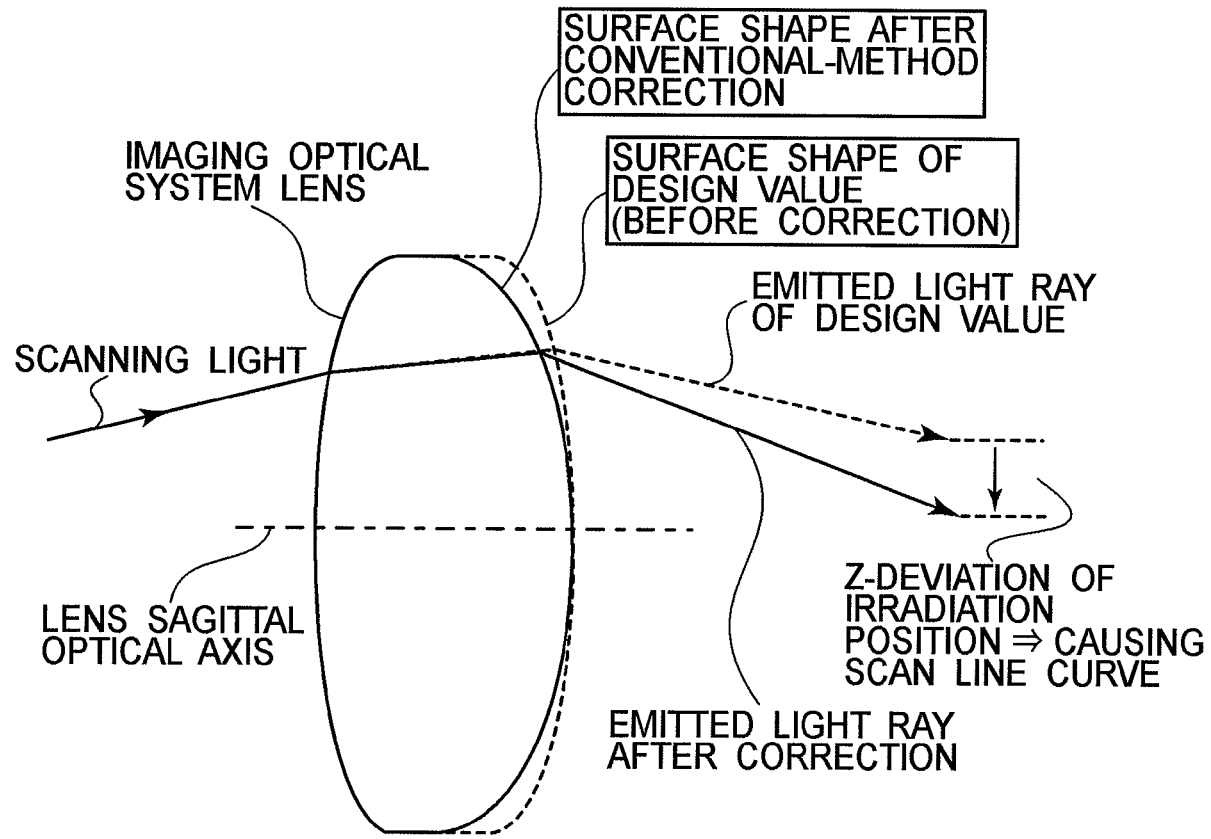
FIG. 11 is a schematic diagram for explaining a conventional method of correcting an image plane deviation in the sub-scan direction.

FIG. 11 is a schematic diagram for explaining a conventional image plane deviation correction method. FIG. 11 is a sub-scan sectional view of an imaging lens at an arbitrary main-scan direction position.

Conventionally, for correction of the image plane deviation in the sub-scan direction, the radius of curvature is changed to be smaller with respect to the optical axis, as compared with the designed arcuate shape.

Figure 5A:
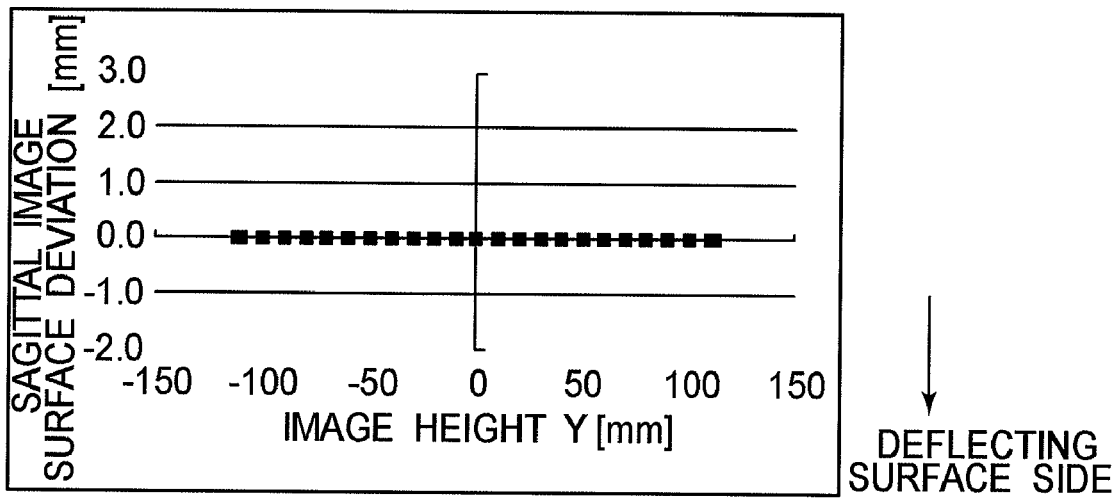
FIG. 5A is a graph illustrating the image plane deviation (after correction based on a conventional correction method) in the sub-scan direction, of a comparative example.

FIG. 5A illustrates the image plane in the sub-scan direction as corrected by the conventional correction method.

It is seen from FIG. 5A that, by using the conventional correction method, the field curvature can be corrected.

However, with the conventional correction method, since the curvature radius is changed to be small around the optical axis in the sub-scan direction, relative to the designed arcuate shape, the surface tilt in the sub-scan direction at the light ray passage position changes as shown in FIG. 11. This causes a deviation of the irradiation position.

If such correction is carried out at different positions of imaging lens in the main-scan direction, corresponding to respective image heights, then the irradiation position in the sub-scan direction deviates at every image height. This results in the field curvature.

Figure 4B:
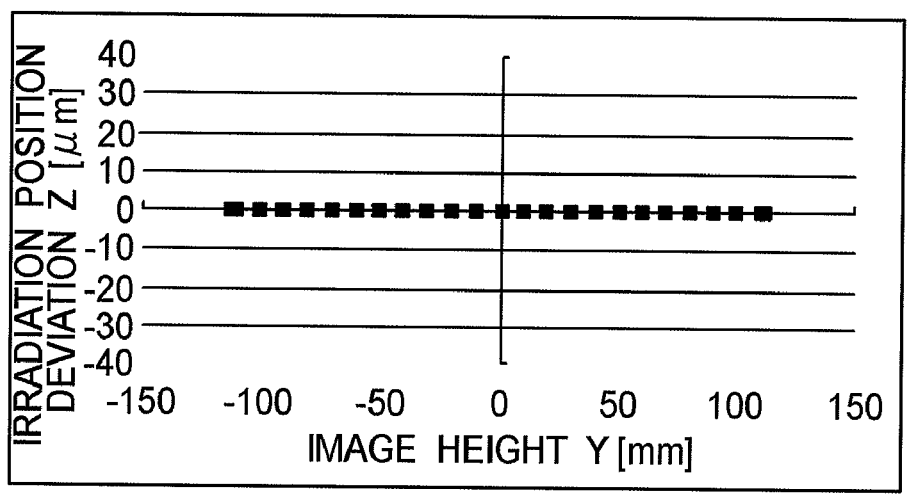
FIG. 4B is a graph illustrating the irradiation position deviation (before correction) in the sub-scan direction, of a comparative example.

FIG. 4B is a graph illustrating the scan line curve before the correction.

Figure 5B:
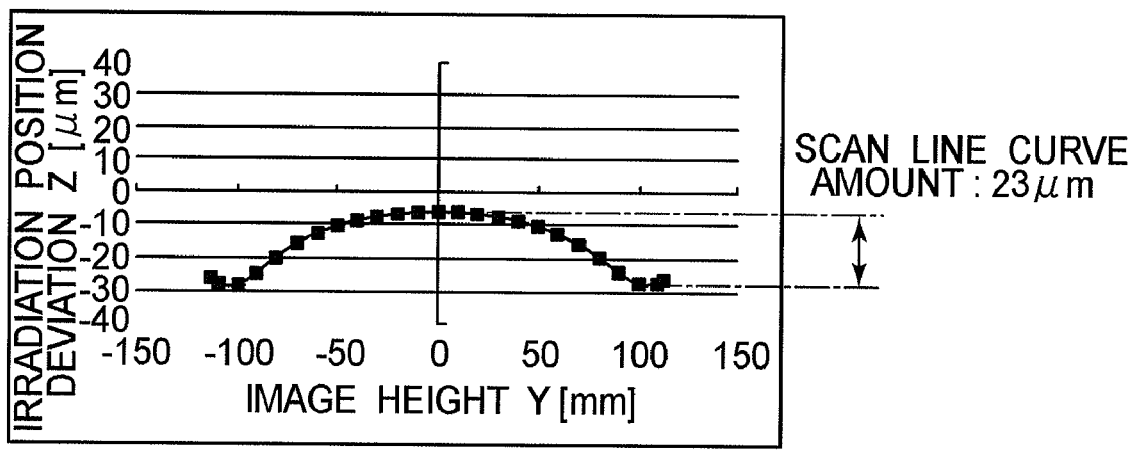
FIG. 5B is a graph illustrating the irradiation position deviation (after correction based on a conventional correction method) in the sub-scan direction, of a comparative example.

FIG. 5B is a graph illustrating the scan line curve after the conventional correction shown in FIG. 11 is made, in comparison with the present embodiment.

It is seen from FIG. 4B that the scan line curve before the correction is suppressed sufficiently well.

On the other hand, it is seen from FIG. 5B that, as the conventional image plane correction is carried out, a scan line curve of 23 μm has occurred at the maximum image height. Thus, if this is used in an image forming apparatus, it is difficult to make a good quality image.

In the present embodiment, in consideration of this, of the lens surfaces of the second imaging lens 7b, the lens surface 7b2 which is closes to the scan surface 8 side is chosen to have a sagittal non-arcuate shape surface, thereby to satisfactorily correct the image plane deviation and the scan line curve.

Figure 6A:
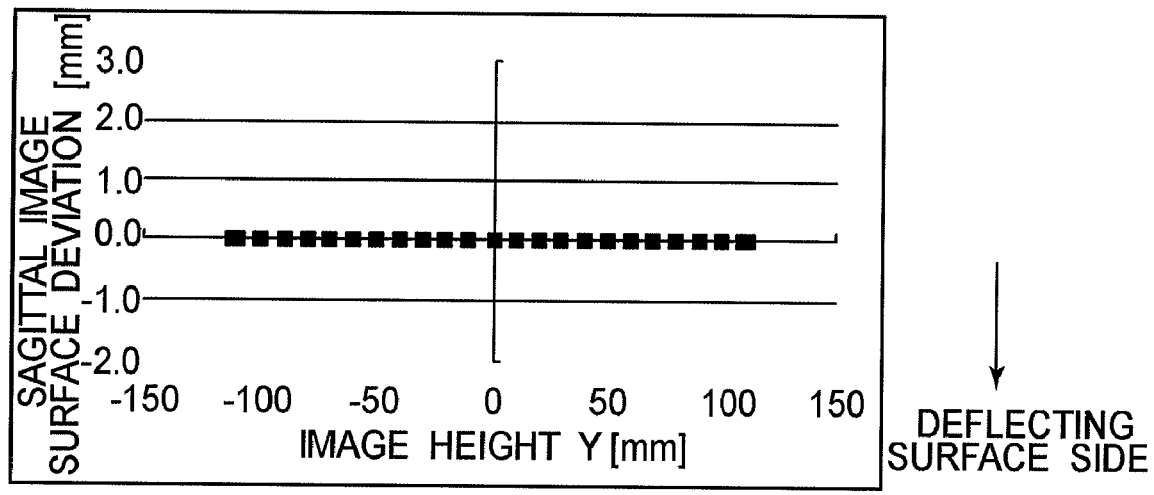
FIG. 6A is a graph illustrating the image plane deviation in the sub-scan direction, in the first embodiment of the present invention.
Figure 6B:
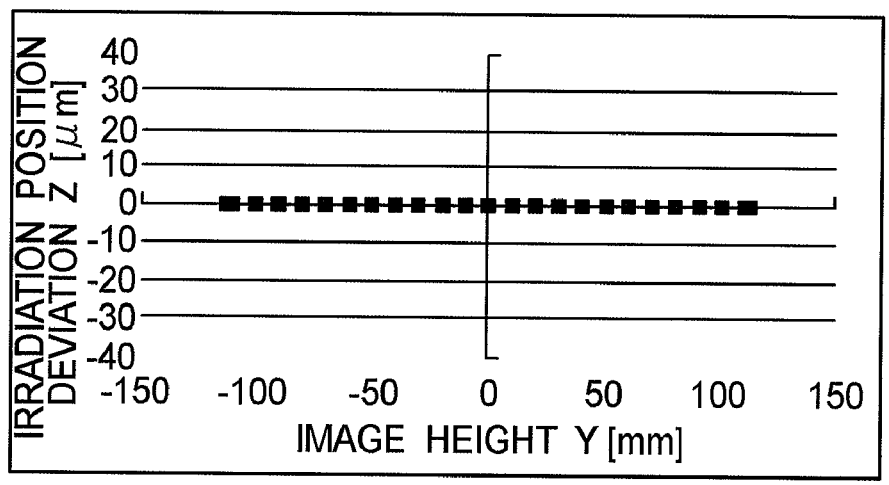
FIG. 6B is a graph illustrating the irradiation position deviation in the sub-scan direction, in the first embodiment of the present invention.

FIG. 6A is a graph illustrating the image plane deviation in the sub-scan direction, in the first embodiment of the present invention. FIG. 6b is a graph illustrating the irradiation position deviation in the sub-scan direction, in the first embodiment of the present invention.

Furthermore, in the present embodiment, the lens surface 7b2 of the second imaging lens 7b which is at the scan surface 8 side is so configured that the centre position of the lens surface in the sagittal section and the principal ray passage position of the scanning light beam are mutually deviated.

Also, the lens surface 7b2 of the second imaging lens 7b at the scan surface 8 side is such a lens surface which has a largest refracting power in the sub-scan section.

Furthermore, the lens surface 7b2 of the second imaging lens 7b at the scan surface 8 side is so formed that the shape in the sagittal section has a positive power or a negative power over the whole region within the sagittal section.

Here, the words "positive power" is in the direction in which the shape nears a convex surface shape, while the negative power is in the direction in which the shape nears a concave surface shape.

Figure 7A:
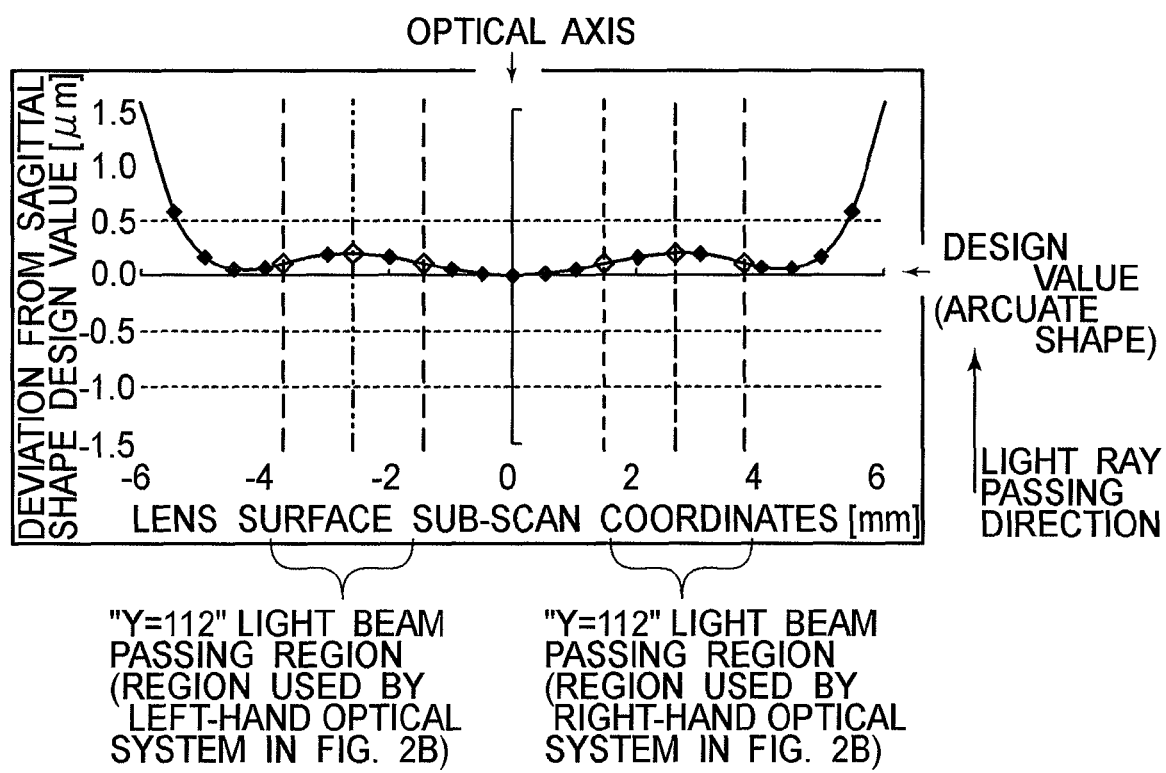
FIG. 7A is a graph illustrating the deviation from a design value (arcuate shape) of the sagittal surface shape at the light ray passage position of image height Y=112, in the first embodiment of the present invention.
Figure 7B:
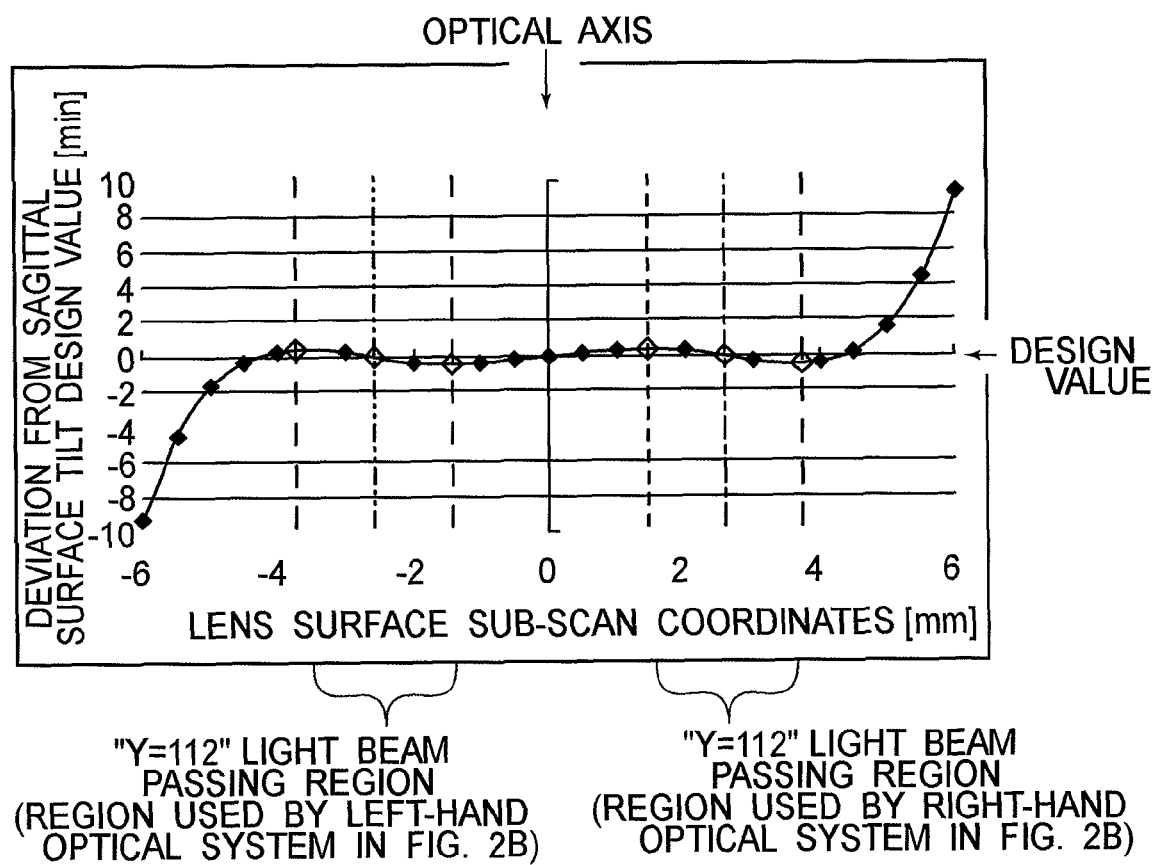
FIG. 7B is a graph illustrating the deviation from a design value of the sagittal surface tilt at the light ray passage position of image height Y=112, in the first embodiment of the present invention.
Figure 7C:
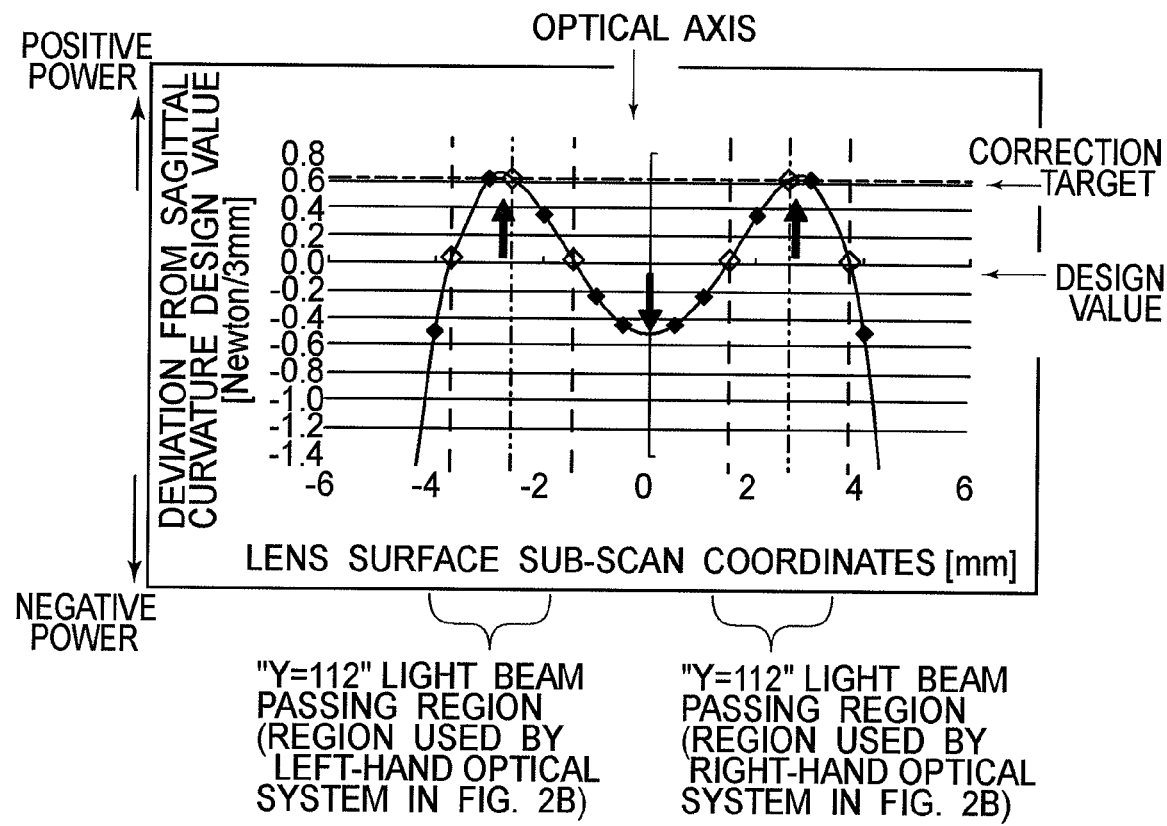
FIG. 7C is a graph illustrating the deviation from a design value of the sagittal curvature at the light ray passage position of image height Y=112, in the first embodiment of the present invention.

FIG. 7A, FIG. 7B and FIG. 7C are graphs illustrating the shape in the sub-scan section at the position in the main-scan direction as the light beam incident on the maximum image height Y=112 passes through the lens surface, at the scan surface 8 side, of the second imaging lens 7b in the present embodiment.

FIG. 7A is a graph illustrating the deviation from the arcuate shape (design value) of the sagittal surface shape. FIG. 7B is a graph illustrating the deviation from the design value of the sagittal surface tilt. FIG. 7C is a graph illustrating the deviation from the design value of the sagittal curvature.

It should be noted that in these diagrams the design value is a value having been designed on an assumption that there is no inside refractive index gradient caused by the molding.

Furthermore, the correction target is the converse of it.

Figure 8A:
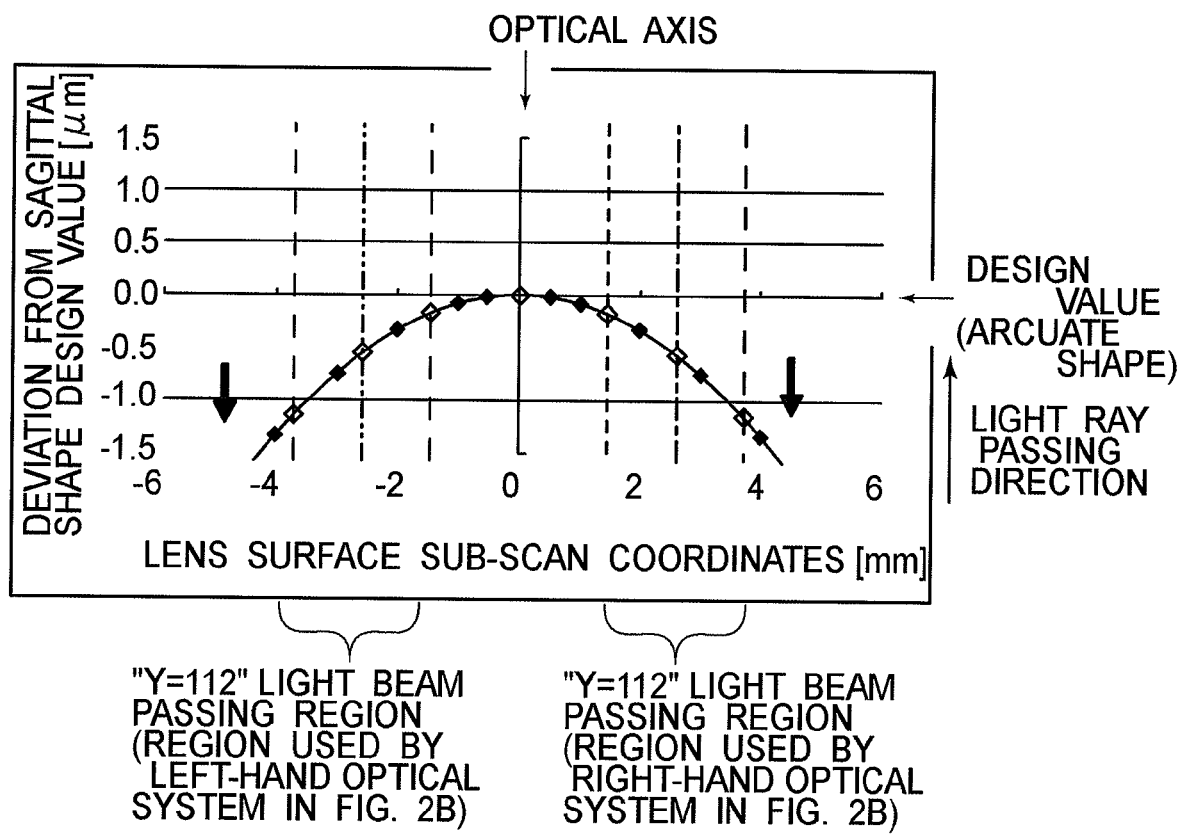
FIG. 8A is a graph illustrating the deviation from a design value (arcuate shape) of the sagittal surface shape at the light ray passage position of image height Y=112, in a conventional example.
Figure 8B:
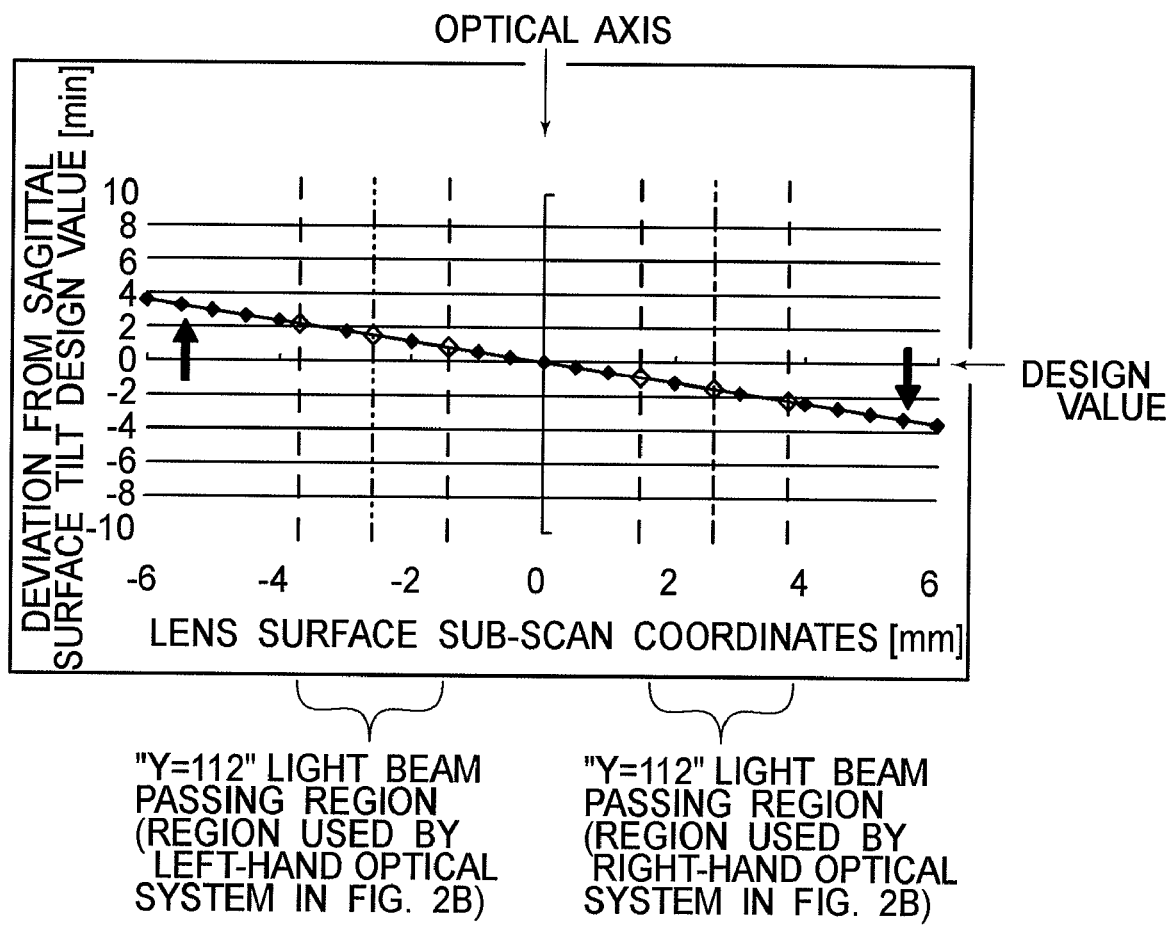
FIG. 8B is a graph illustrating the deviation from a design value of the sagittal surface tilt at the light ray passage position of image height Y=112, in a conventional example.
Figure 8C:
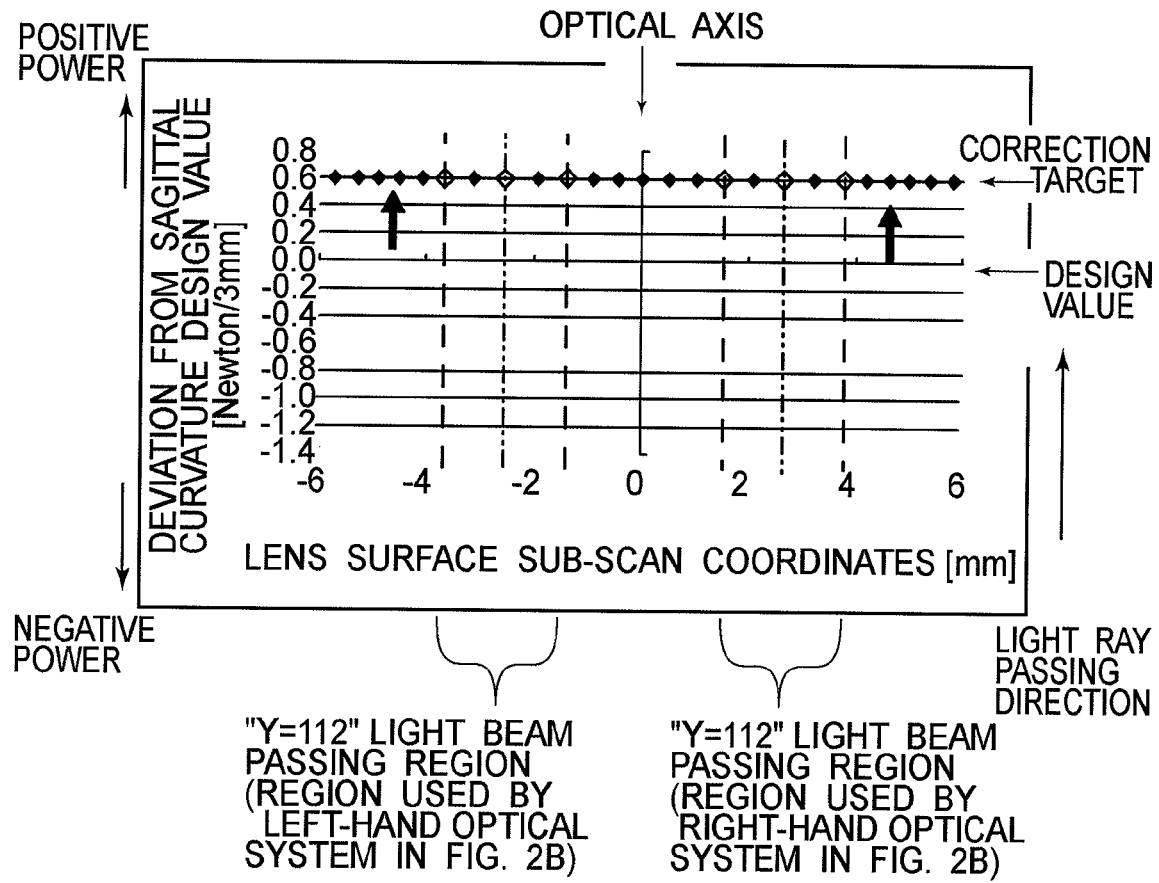
FIG. 8C is a graph illustrating the deviation from a design value of the sagittal curvature at the light ray passage position of image height Y=112, in a conventional example.
Figure 9A:
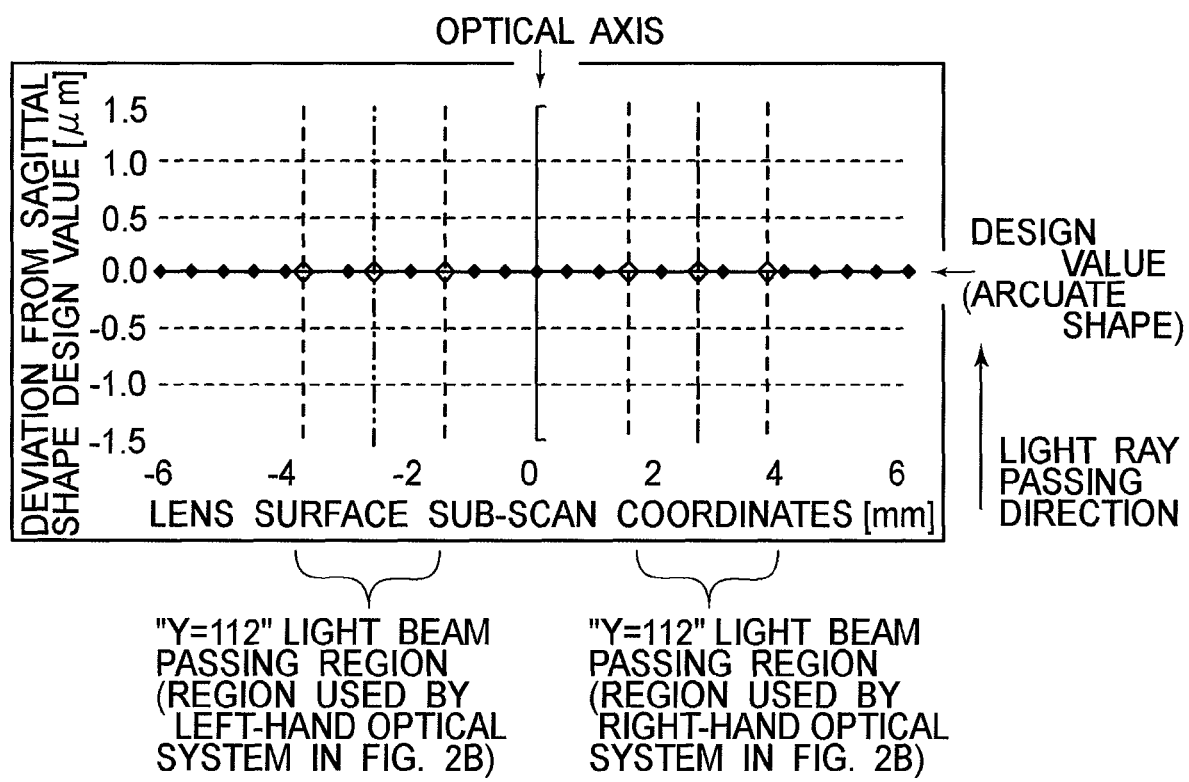
FIG. 9A is a graph illustrating the deviation from a design value (arcuate shape) of the sagittal surface shape at the light ray passage position of image height Y=112, before the correction.
Figure 9B:
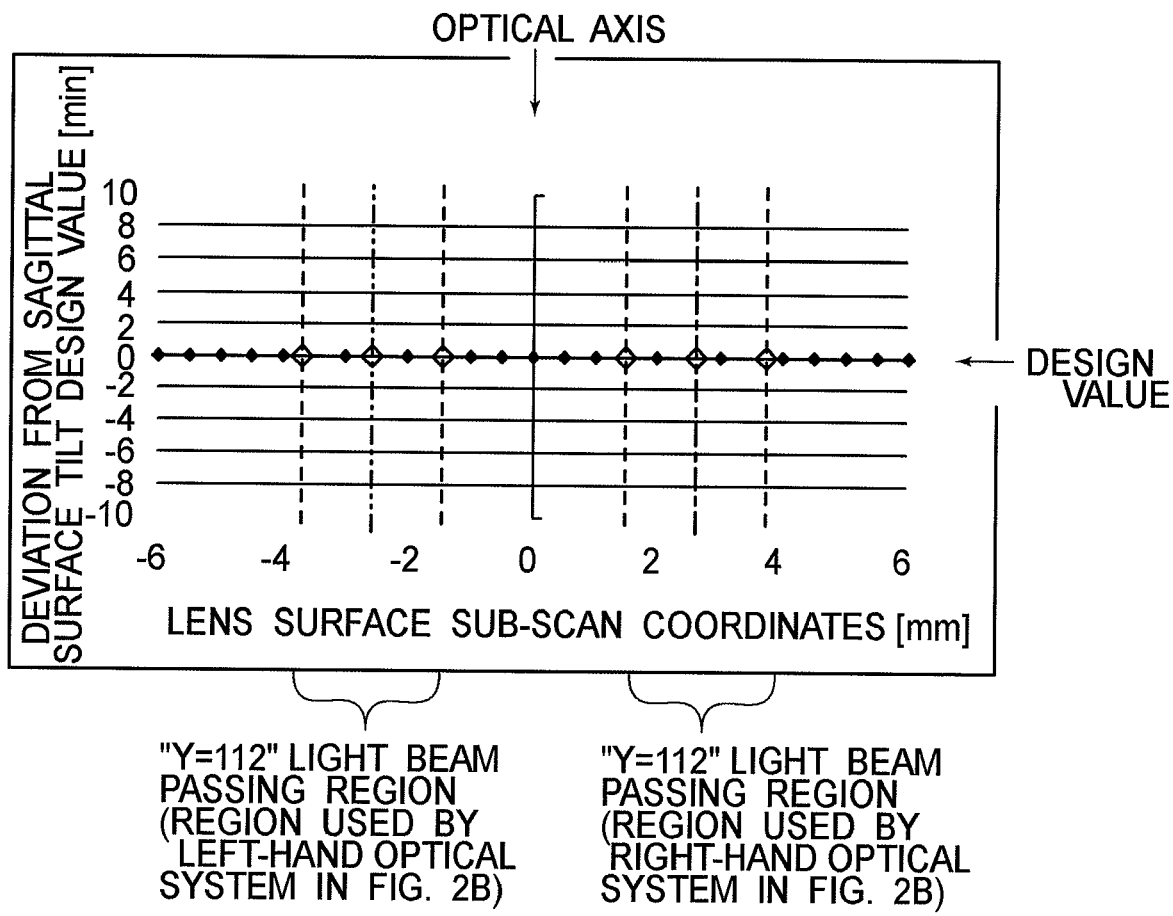
FIG. 9B is a graph illustrating the deviation from a design value of the sagittal surface tilt at the light ray passage position of image height Y=112, before the correction.
Figure 9C:
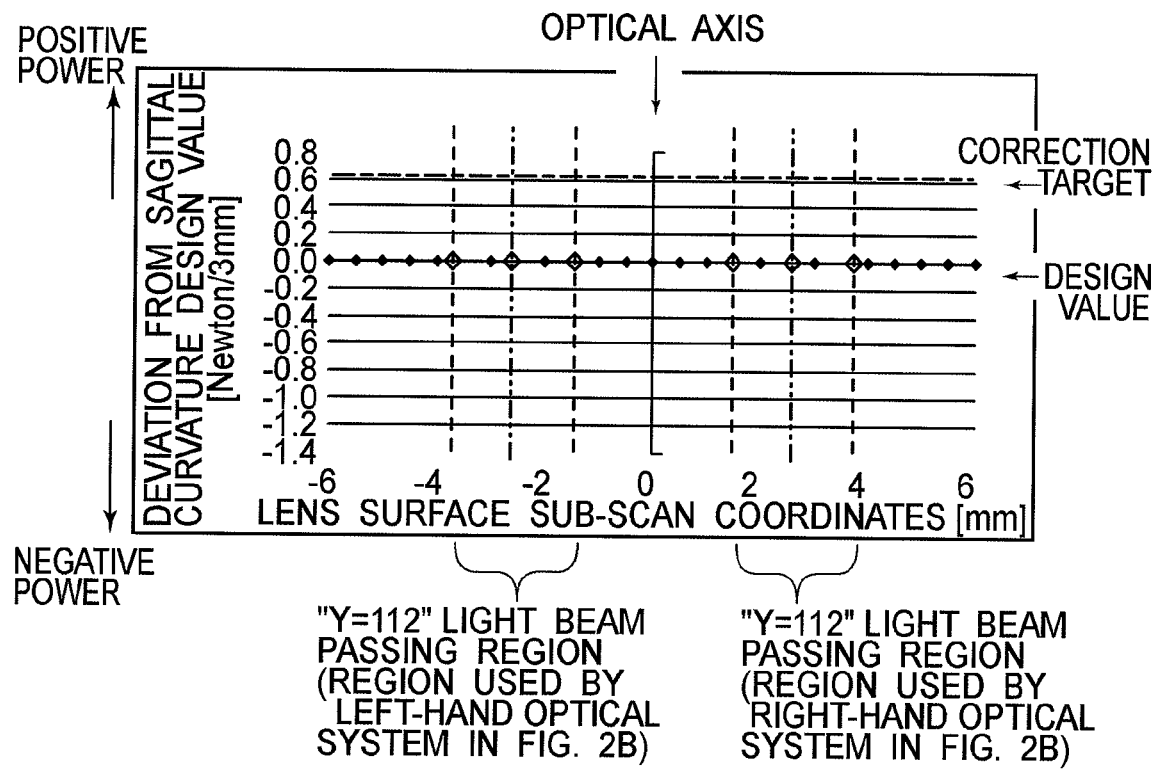
FIG. 9C is a graph illustrating the deviation from a design value of the sagittal curvature at the light ray passage position of image height Y=112, before the correction.

Furthermore, for explaining the present embodiment more definitely, the lens surface shape at the scan surface side of the second imaging lens 7b before the correction is illustrated in FIG. 9A, FIG. 9B and FIG. 9C, respectively. Also, the surface shape after the conventional correction is carried out is illustrated in FIG. 8A, FIG. 8B and FIG. 8C, respectively.

FIG. 9C is a graph illustrating the deviation from the design value of the local sagittal curvature.

In order to correct the sub-scan direction image plane deviation caused by the refractive index gradient, the positive power should be provided so as to obtain the correction target value depicted by the dash-and-dot line in FIG. 9C.

In the conventional correction method, by changing the arcuate curvature radius to be small around the sagittal optical axis, a positive power is given over the whole area in the sagittal section and, by doing so, the image plane deviation is corrected.

However, in that occasion, as seen from FIG. 8B, the surface tilt of the sagittal in the light beam passage region deviates by about 1.7 minutes from the design value and, as a result, the scan line curve is caused thereby.

In the present embodiment, in consideration of this, as compared with the arcuate shape of the design value, a concave surface shape is set at the lens central portion while a convex surface is set at the light beam passage region (both sides of the lens center), as shown in FIG. 7C.

With this arrangement, as can be seen from FIG. 7C, the surface tilt of the sagittal at the light ray passage position equals the design value.

It is to be noted that, as can be seen from FIG. 7C, a positive power of 0.6 [Newton/φ3 mm] width has been added, more than the design value, to the sagittal curvature at the light ray passage position of the maximum image height Y=112.

More specifically, in the present embodiment, as shown in FIG. 7C, the local sagittal curvature at the light ray passage position is set to be a positive power by around 1.1 [Newton/φ3 mm] as compared with the sagittal curvature at the optical axis.

With this arrangement, the image plane deviation due to the refractive index gradient can be corrected without deteriorating the scan line curve.

Furthermore, the local sagittal curvature at the sagittal optical axis is set to be a negative power of around 0.5 [Newton/φ3 mm] as compared with the design value, while the local sagittal curvature at the light ray passage position is set to be a positive power of around 0.6 [Newton/φ3 mm] as compared with the design value.

Figure 10:
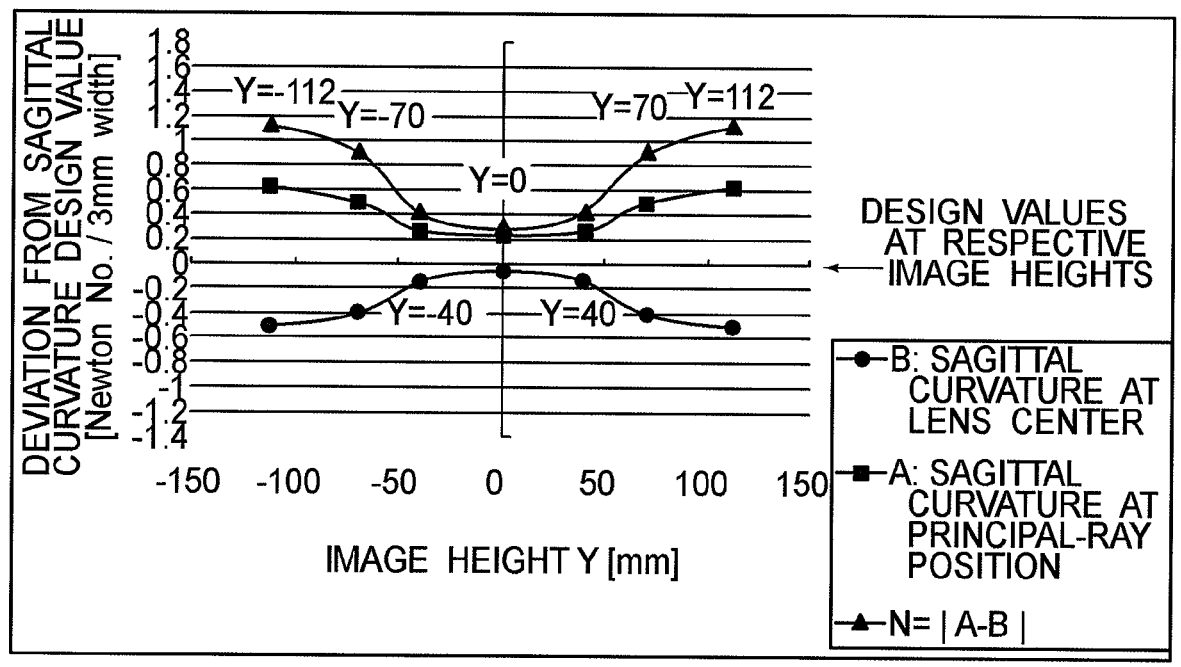
FIG. 10 is a graph illustrating the difference in the sagittal curvature between the passage position of the principal ray of each light beam directed to a respective image height and the lens centre position, in the first embodiment of the present invention.

FIG. 10 is a graph plotting the sagittal curvature at the passage position upon the lens surface, at the scan surface side, of the second imaging lens 7b of the light beam directed toward respective image heights.

The mark A (square) in FIG. 10 depicts the value of the deviation from the design value of the sagittal curvature at the passage position of the principal ray of the scanning light beam upon the lens surface, at the scan surface side, of the second imaging lens 7b, in the sagittal section.

The mark B (circle) in FIG. 10 depicts the value of the deviation from the design value of the sagittal curvature at the centre position (centre position of the mirror surface portion of the lens in the sagittal section, which corresponds to the sagittal optical axis in the present embodiment) of the lens surface, at the scan surface side, of the second imaging lens 7b in the sagittal section.

Furthermore, the mark N (triangle) in FIG. 10 depicts the value of the difference between the sagittal curvature A at the passage position of the principal ray of the scanning light beam upon the lens surface, at the scan surface side, of the second imaging lens 7b and the sagittal curvature B at the centre position of the lens surface in the sagittal section. This can be detected from:

$$N=|A-B|$$

This means that, the larger the value of this N is, the larger the sagittal curvature difference between the sagittal curvature A at the passage position of the principal ray and the sagittal curvature B at the lens centre position is.

It is seen from FIG. 10 that, in order to correct the field curvature in the sub-scan direction, with a larger image height, the value of the rectangle mark A becomes large. Namely, with respect to the design value, the positive power to be added is enlarged.

Furthermore, in order that the sagittal surface tilt which deviates from the design value is corrected by enlarging the value of the rectangle mark A, the value of the circular mark B is made smaller. Namely, with respect to the design value, the negative power to be added is enlarged.

Therefore, with regard to A−B, with the increasing image height (as the distance from the optical axis increases in the main-scan direction) N (=|A−B|) becomes large. Based on this non-arcuate shape, the image plane deviation at every image height can be corrected and, yet, the irradiation position is not deviated by the correction.

In other words, the field curvature can be corrected without deteriorating the scan line curve.

In the present embodiment, N>0 is set for all the image heights. More specifically, the scan line curve and the image plane deviation (field curvature) due to the internal strain (refractive index gradient) can be corrected by setting the value of N at the light-ray passage position of the light beam, with the image heights Y=−112 to −60 mm and Y=60 to 112 mm, to satisfy 0.7<N<10.

It should be noted that, in the conditional expression mentioned above, N is the value obtainable by converting, in the sagittal section, the difference between the sagittal curvature at the passage position of the principal ray of the scanning light beam and the sagittal curvature at the centre position of the lens surface, in terms of the Newton number per 3 mm width.

Here, the unit of N is [Newton number/φ3 mm width] (the Newton number is a value converted with respect to the wavelength λ=587.56 nm).

The present embodiment is not limited to this sagittal non-arcuate shape. Advantage results attained by the invention are available as long as there is a region satisfying the following conditional expression (1), in the whole region along the main-scan direction in which the light beam passes through the sagittal non-arcuate shape surface.

$$0.7<N<10s \tag{1}$$

When there is no region in which the value of N of the sagittal non-arcuate shape surface is equal to or less than 0.7 [Newton number/3 mm width], and if the image plane deviation and the scan line curve which should corrected are larger, for the reasons to be described below, sufficient correction is difficult to accomplish and thus good imaging performance is difficult to obtain.

For example, in the present embodiment, a comparatively thin thickness imaging lenses are used: the first imaging lens 7a has a thickness of 5 mm on the optical axis while the second imaging lens 7b has a thickness of 4 mm.

However, with regard to a plastic lens having a thickness of 10 mm or more, the lens internal strain (refractive index gradient or the like) is larger, and thus the image plane deviation due to it becomes larger.

Furthermore, if the molded lens is warped, the scan line curve caused thereby should be corrected as well.

In addition, if the field curvature and the scan line curve caused by any other lens have to be corrected, then the correction amount for the image plane deviation and the scan line curve becomes quite large.

Because of these, in the case where the value of N is not greater than 0.7 [Newton number/3 mm width], it is difficult to well correct the image plane deviation and the scan line curve, and it becomes difficult to obtain a good imaging performance.

On the contrary, if the value of N is set to be not less than 10.0 [Newton number/3 mm width], the following problems will be raised.

First, since the amount of local curvature change in the light beam passage region is too large, it becomes difficult to well correct the aberration and hence it becomes difficult to image the light into a good spot on the scan surface.

A second point is that the influence on the imaging performance by the tolerance such as the mounting positional error of optical components or the like is large.

More specifically, due to the increased non-arcuate amount, the focus error caused by a deviation of the light ray passage height in the sub-scan direction on the lens surface as well as the irradiation position deviation in the sub-scan direction and the amount of comatic aberration become extremely large. It becomes difficult to obtain a good spot.

Furthermore, in the present embodiment, the sagittal non-arcuate shape is so set that the sagittal curvature at the passage position of the principal ray is a positive power as compared with the sagittal curvature at the lens centre position (namely, in the relationship of A−B>0, by which the image plane being deviated in the direction apart from the optical deflector 5 is corrected.

It should be noted that the present invention is not limited to this sagittal non-arcuate shape. Advantage effects obtainable with the present invention are available as long as there is an extreme value of the sagittal curvature in the light beam passage region, regardless that the sagittal curvature at the principal-ray passage position is set to have a negative power as compared with the sagittal curvature at the lens centre position.

For example, if the sagittal image surface is deviated in the direction approaching the optical deflector 5 due to an internal strain of the imaging lens or a deviation from the design value of the surface shape, the shape may be set as follows.

That is, the sagittal non-arcuate shape may be so set that the sagittal curvature at the principal-ray passage position has a negative power as compared with the sagittal curvature at the lens centre position (a relationship of A−B<0).

With this arrangement, the image plane deviation can be corrected, and the scan line curve can corrected as well. Thus, the advantageous effects of the invention are well provided.

Next, a numerical example of the structure of the optical scanning device according to the first embodiment of the present invention is shown in Table 1.

The parameters r, d and n of the input optical system LA in the first embodiment are shown in the Table 2.

The aspherical shape of the cylindrical lens 4 in the first embodiment is shown in Table 3.

The aspherical shape of the lens of the imaging optical system LB in the first embodiment is shown in Table 4.

Here, it should be noted that the non-arcuate shape at the tenth surface in Table 4s is the value before the correction (i.e. design value). The sagittal non-arcuate amount added during the correction will be described later.

Furthermore, in these tables, the symbol "E−X" means "*10$^{-X}$".

In this embodiment, in consideration of the points described above, the scan line curve and the image plane deviation due to the refractive index gradient are corrected by satisfying the aforementioned conditional expression (1).

Preferably, conditional expression (1) had better be set as follows.

$$1.0 < N < 9 \quad (1a)$$

TABLE 1

Table 1: Structure of the First Embodiment

| | | | |
|---|---|---|---|
| Angle defined by Optical Axes of Input Optical System and Imaging Optical System in Main-Scan Direction | 2φ | 90 | (deg) |
| Largest Effective Scan View Angle | plus/minus θ max | 38.2 | (deg) |
| Collimator Lens Focal Length | Fcol | 20 | (mm) |
| Polygon Inscribed Circle Radius | R | 7.07 | (mm) |
| Sub-Scan Oblique Incidence Angle (for Upper Imaging Optical System) | α | 3 | (deg) |
| Sub-Scan Oblique Incidence Angle (for Lower Imaging Optical System) | α | −3 | (deg) |
| Imaging Optical System Sub-Scan Magnification | Bs | 1.3 | (times) |
| Sub-Scan Direction Resolution | Dpi | 600 | (dpi) |
| Effective Scan Width | W | 224 | (mm) |
| Imaging Optical System f-theta Coefficient | K | 167.8 | (mm/rad) |

TABLE 2

Table 2: RDN of the First Embodiment

| Surface | R | D | N |
|---|---|---|---|
| Semiconductor Laser Emission 1st | — | 16 | 1 |

TABLE 2-continued

Table 2: RDN of the First Embodiment

| | Surface | R | D | N |
|---|---|---|---|---|
| Point 1 | | | | |
| Stop | | — | 2.32 | 1 |
| Collimator Lens 2 | 2nd | infinite | 3 | 1.762 |
| | 3rd | −15.22 | 12.43 | 1 |
| Cylindrical Lens 4 | 4th | Table 3 | 3 | 1.524 |
| | 5th | infinite | 77.26 | 1 |
| Polygon Mirror Deflecting Surface 6 | 6th | infinite | 16 | 1 |
| Imaging Optical System Lens 7a | 7th | Table 4 | 5 | 1.524 |
| | 8th | Table 4 | 61.3 | 1 |
| Imaging Optical System Lens 7b | 9th | Table 4 | 4 | 1.524 |
| | 10th | Table 4 | 103.8 | 1 |

TABLE 3

Table 3: Cylindrical Lens of the First Embodiment

| | | Cylindrical Lens 4 4th Surface |
|---|---|---|
| Meridional Shape | R | infinite |
| Sagittal Shape | r | 58.62 |

TABLE 4

Aspherical Shape of Scanning Optical System of the First Embodiment

| | | Imaging Lens 7a | | Imaging Lens 7b | |
|---|---|---|---|---|---|
| | | 7th Surface | 8th Surface | 9th Surface | 10th Surface |
| Meridional Shape | R | −3.9609E+01 | −2.7559E+02 | −1.0297E+03 | 9.7015E+02 |
| | K | −1.5180E+00 | −2.8213E+00 | −8.8075E+02 | 2.0189E+00 |
| | B4 | −1.0846E−05 | −1.0270E−05 | −1.4002E−07 | −6.2822E−06 |
| | B6 | 2.3498E−08 | 2.9887E−8 | 1.1905E−11 | 5.6760E−11 |
| | B8 | −1.5342E−10 | −7.1586E−11 | 8.5688E−16 | −2.7512E−15 |
| | B10 | 2.0904E−13 | 6.0716E−15 | 1.6198E−20 | −2.0821E−19 |
| Sagittal Shape | r | −1.0E+03 | −1.0E+03 | 1.7125E+02 | −2.827E+01 |
| | D2 | 0 | 0 | 0 | 1.4137E−04 |
| | D4 | 0 | 0 | 0 | −3.2588E−08 |
| | D6 | 0 | 0 | 0 | 5.9948E−12 |
| | D8 | 0 | 0 | 0 | −2.8299E−16 |
| | D10 | 0 | 0 | 0 | −2.3929E−20 |

Here, the aspherical shape can be defined by an expression below.

It is assumed that: the point of intersection between the lens curved surface and the optical axis taken as an origin; the optical axis direction is taken as an X axis; an axis orthogonal to the optical axis in the main-scan section is taken as Y axis; and an axis orthogonal to the optical axis in the sub-scan section is taken as Z axis.

When the cutting line between the X-Y plane and the curved surface is taken as a meridional, and a cutting plane between the X-Z plane orthogonal thereto and the curved surface is taken as a sagittal, the shape of the meridional can be depicted by an expression (2) below.

$$X = \frac{\frac{Y^2}{R}}{1 + \sqrt{1 - (1+K) \times \left(\frac{Y}{R}\right)^2}} + B_4 Y^4 + + B_6 Y^6 + B_8 Y^8 + B_{10} Y^{10} \quad (2)$$

wherein R is the curvature radius and K, $B_4$, $B_6$, $B_8$ and $B_{10}$ are aspherical coefficients of the meridional.

The shape of the sagittal can be depicted by an expression (3) below.

$$S = \frac{\frac{Z^2}{r'}}{1 + \sqrt{1 - \left(\frac{Z}{r'}\right)^2}} \quad (3)$$

Here, the curvature radius r' of the sagittal varying with the value of Y can be depicted by an equation (4) below.

$$r' = r_0 \times (1 + D_2 Y^2 + D_4 Y^4 + D_6 Y^6 + D_8 Y^8 + D_{10} Y^{10}) \quad (4)$$

wherein $r_0$ is the sagittal curvature radius on the optical axis and $D_2$, $D_4$, $D_6$, $D_8$ and $D_{10}$ are coefficients.

In the present invention, in addition to the non-arcuate shape at the 10th surface shown in Table 4, the sagittal non-arcuate amount is added to correct the image plane deviation due to the refractive index gradient.

The sagittal aspherical shape of the lens of the imaging optical system in the first embodiment is shown in Table 5.

TABLE 5

Sagittal Aspherical Shape of Scan-Surface Side Lens Surface (10th Surface) of Second
Imaging Lens of Imaging Optical System LB in the First Embodiment

| Image Height | Lens Main-Scan Direction Coordinates | Design Sagittal r' | Corrected Sagittal r" | 4th Term E4 | 6th Term E6 |
|---|---|---|---|---|---|
| 112  | 54.34 | −34.82 | −34.98 | −6.3747E−6 | 1.5829E−7 |
| 70   | 32.36 | −31.49 | −31.60 | −7.2557E−6 | 2.5302E−7 |
| 40   | 18.11 | −29.47 | −29.50 | −4.2841E−6 | 1.94358E−7 |
| 0    | 0     | −28.28 | −28.29 | −2.8706E−6 | 1.2964E−7 |
| −40  | 18.11 | −29.47 | −29.50 | −4.2841E−6 | 1.94358E−7 |
| −70  | 32.36 | −31.49 | −31.60 | −7.2557E−6 | 2.5302E−7 |
| −112 | 54.34 | −34.82 | −35.0  | −6.3747E−6 | 1.5829E−7 |

Here, the non-arcuate shape of the sagittal can be depicted by an expression (3a) below.

$$S = \frac{\frac{Z^2}{r''}}{1 + \sqrt{\left(1 - \left(\frac{Z}{r''}\right)^2\right)}} + E_4 Z^4 + E_6 Z^6 \quad (3a)$$

In the present embodiment, for better understanding of the structure, the sagittal non-arcuate shape is set only in terms of the sagittal curvature radius r' at each main-scan direction coordinate to the lens surface optical axis, and the fourth term and the sixth term.

However, this sagittal non-arcuate shape is not limited to the expression. As long as there is an extreme value of the sagittal curvature in the scan light beam passage region on the lens surface, the advantageous effects of the invention are well obtainable.

More preferably, at least one surface of the lens surfaces in the region in which the scanning light beam passes should satisfy the following conditional expression (1'):

$$0.7 < A - B < 10.0 \quad (1')$$

If the sagittal non-arcuate lens surface has a region satisfying this relation, the advantageous effects of the present invention are fully obtainable.

In the present embodiment, as shown in FIG. 7C, the sagittal non-arcuate shaped surface is so set that the passage position of the principal ray of the light beam corresponds to the extreme value of the sagittal curvature. By doing so, the change of the sagittal curvature inside the light beam is made symmetric about the principal-ray passage position and, thus, generation of comatic aberration resulting from the correction is well suppressed.

Although in this embodiment the local sagittal curvature change within the light beam is made symmetric about the principal-ray passage position, as long as there is an extreme value of the sagittal curvature in the light beam passage region, the change of the sagittal curvature may be set asymmetric within the light beam.

For example, in a case where comatic aberration occurs in the input optical system or in any other imaging lens, the change of the sagittal curvature may be so set that the sagittal curvature changes asymmetrically within the light beam and that an extreme value is present within the light beam passage region. By doing so, the comatic aberration can be corrected and yet the advantageous effects of the present invention are well obtainable.

Furthermore, in the present embodiment, as shown in FIG. 7C, the shape in the sagittal section of the sagittal non-arcuate shaped surface is so set that a local minimum point of the sagittal curvature is located at the lens center (sagittal optical axis of the lens surface), while a local maximum point of the sagittal curvature is located inside the sagittal passage region.

Here, the sign of the sagittal curvature is positive if the sagittal surface has a positive power, and it is negative if the sagittal surface has a negative power.

By setting the optical arrangement in this manner, in either an optical system wherein the upper side of the lens center is used or an optical system wherein the lower side of the lens center is used, both of the scan line curve and the image plane deviation can be corrected.

In the present embodiment, since the imaging optical system is such that the scan line curve is good and only the image plane deviation occurs therein, a positive power has been locally added to the design value at the light ray passage position and yet not to cause a change in the sagittal surface tilt.

Furthermore, the sagittal non-arcuate shape has been set to the sagittal curvature so as to correct the field curvature without changing the scan line curve.

However, the present embodiment is not limited to this. The sagittal non-arcuate shape may be set to shift the sagittal surface tilt from the design value.

For example, if the injection molded imaging lens is warped in the sub-scan direction, there occurs scan line curve in addition to the image plane deviation.

In such case, the sagittal non-arcuate shape may be so set as to intentionally shift the sagittal surface tilt from the design value. By doing so, the image plane deviation and the scan line curve can be corrected together.

In this embodiment, among a plurality of imaging lenses constituting the imaging optical system LB, the scan-surface-8 side lens surface of the imaging lens (second imaging lens 7b) which is closest to the scan surface 8, is chosen to have a sagittal non-arcuate shape. This is because of the following reasons.

Since, among the four lens surfaces of the imaging optical system, this lens surface has a widest region through which the scanning light beam directed to respective image heights passes, in both of the main-scan direction and the sub-scan direction. Thus, the influence on other imaging performance (e.g., deterioration of aberration) to be caused by changing the lens surface from the sagittal arcuate shape to the sagittal non-arcuate shape would be smallest.

Another reason is that the precision required for processing of the sagittal non-arcuate shape can be lower.

However, if the influence on the two points mentioned above is sufficiently small and can be disregarded, among a plurality of imaging lenses a lens surface other than the lens surface of the imaging lens closest to the scan surface may be chosen to set the sagittal non-arcuate shape. Even in that occasion, both of the image plane deviation and the scan line curve can be corrected, and advantageous effects of the present invention are well obtainable.

In this embodiment, in order to correct the image plane deviation and the scan line curve without deteriorating other imaging performances, only the scan-surface-side lens surface of the second imaging lens 7b is chosen to set the sagittal non-arcuate shape. However, a plurality of lens surfaces may be chosen to similarly set the sagittal non-arcuate shape.

If plural lens surfaces are formed with a sagittal non-arcuate shape, even in an imaging optical system having a large field curvature due to the internal strain, the image plane deviation and the scan line curve can be fully corrected. Thus, the advantageous effects of the present invention are well obtainable.

In the present embodiment, in order to correct the image plane having been deviated in the direction apart from the deflecting surface, the sagittal non-arcuate shaped surface is so set that a local minimum point of the sagittal curvature is located at the lens center, in the sagittal section, and that a local maximum point of the sagittal curvature is located inside the light beam passage region.

However, the invention is not limited to this. The shape in the sagittal section of the sagittal non-arcuate shaped surface may be so set that a local maximum point of the sagittal curvature is located at the lens center (sagittal optical axis of the lens surface) and that a minimum point of the sagittal curvature is located inside the sagittal passage region. Even in that occasion, the advantageous effects of the present invention are fully obtainable.

Here, the sign of the sagittal curvature is positive if the sagittal surface has a positive power, and it is negative if the sagittal surface has a negative power.

For example, in an occasion where the sagittal image surface is deviated in the direction approaching the deflecting means due to the internal strain of the imaging lens of the imaging optical system or a deviation from the design value of the surface shape, the sagittal non-arcuate shaped surface may be so set that a local maximum point of the sagittal curvature is located at the lens center in the sagittal section.

Additionally, by setting the surface so that a local minimum point of the sagittal curvature is located inside the light beam passage region, deterioration of the scan line curve can be avoided and, yet, the image plane deviation can be corrected.

In the present embodiment, since there are scan line curve and image plane deviation symmetric in the main-scan direction with respect to the axial image height Y=0, the change of the sagittal non-arcuate amount with respect to the main-scan direction is set to be laterally symmetric.

If there are laterally symmetric image plane deviation or scan line curve in the main-scan direction, then the change of the sagittal non-arcuate amount with respect to the main-scan direction should be set to be laterally asymmetric.

In the present embodiment, a molded lens formed by injection molding is used in the imaging optical system.

However, the present invention is not limited to this. As long as it is a molded lens formed by using a lens molding die, internal strain occurs during the molding process regardless of the molding method (e.g., re-melt molding method) and thus the image plane deviation attributable to it occurs. Thus, the advantageous effects of the present invention are fully applicable.

In the present embodiment, a lens made of a resin and molded by using a lens molding die is used in the imaging optical system. However, as long as it is a molded lens formed by using a lens molding die, internal strain occurs during the molding process regardless of the lens material, and thus the image plane deviation attributable to it occurs. Therefore, even if the lens used in the imaging optical system is made of a glass, the advantageous effects of the present invention are fully applicable.

In the present embodiment, a pair of scanning units SR and SL are arranged into a sub-scan oblique incidence optical system and they are disposed opposed to each other. With this arrangement, some optical components can be shared and the optical scanning device can be made compact.

However, the present invention is not limited to this. Without opposed disposition, if it is an imaging optical system in which the scanning light beam uses the sagittal optical axis of the lens, the advantageous effects of the present invention are fully obtainable.

It should be noted that, although in the present embodiment, the imaging optical system LB is comprised of two pieces of lenses, the invention is not limited to this. For example, it may be comprised of a single lens or, alternatively, three or more lenses. Furthermore, the imaging optical system may be provided to include a diffractive optical element.

Furthermore, it should be noted that in the present embodiment there is no need of constructing the polygon mirror 5 in a multistage structure such as disclosed in patent document No. 1. Furthermore, there is no need of making the height, in the sub-scan direction, of the imaging lens 7a at the polygon mirror 5 side extremely high.

Because of this, the height of the optical scanning device in the sub-scan direction can be advantageously kept low.

[Correction Processing Method for Mirror Surface Piece]

A mirror surface piece is used in the lens molding die for a lens to be included in the imaging optical system, constituting the optical scanning device of a sub-scan oblique incidence optical system of the present embodiment, and a correction processing method for that mirror surface piece in the present embodiment is as follows.

The correction processing value of the mirror surface piece for at least one surface, among the lens surfaces of the lens molding die, concerns a sagittal non-arcuate shape.

Here, the sagittal non-arcuate shape has an extreme value of the sagittal curvature inside the passage region of the scanning light beam in a sagittal section.

Based on the correction processing value of the mirror surface piece, correction processing of the mirror surface piece of the lens molding die is carried out.

This mirror surface piece correction processing method may include:

(1) A molded lens having been molded by using a lens molding die is placed on a light path of an optical system equivalent to the optical scanning device, and the field curvature and the scan line curve are measured; and (2) Based on the measured scan line curve and sub-scan direction field curvature on the scan surface, the correction processing value of the mirror surface piece of the sagittal non-arcuate shape is so set as to correct the scan line curve and the sub-scan direction field curvature.

The correction processing value of the mirror surface piece of the sagittal non-arcuate shape may be such that, in the sagittal section, a local minimum point of the sagittal curvature is present at the sagittal center or in the neighborhood of it and, also, a local maximum point of the sagittal curvature is provided inside the light beam passage region.

The correction processing value of the mirror surface piece of the sagittal non-circular shape may be such that, in a sagittal section, a local maximum point of the sagittal curvature is present at the lens center or in the neighborhood of it and, also, a local minimum point of the sagittal curvature is provided inside the light beam passage region.

The correction processing value of the mirror surface piece of the sagittal non-circular shaped surface may be such that, in whole area in the main-scan direction through which the light ray passes, there is a region which satisfies a conditional expression (5) below.

$$0.7 < N' < 10 \tag{5}$$

Here, N' is a value obtainable by converting, in the sagittal section, the difference between the sagittal curvature at the passage position of the principal ray of the scanning light beam and the sagittal curvature at the centre position of the lens surface, in terms of the Newton number with respect to the 3 mm width. Here, the unit is [Newton number/3 mm width].

With regard to the correction processing value of the mirror surface piece of sagittal non-circular shape, the difference between the sagittal curvature at the passage position of the principal ray of the scanning light beam in the sagittal section and the sagittal curvature at the centre position of the lens surface increases as the spacing from the optical axis increases in the main-scan direction.

The sagittal non-circular shaped surface of the molded lens formed by using a mirror surface piece having been corrected by the mirror surface piece correction processing method is such that the surface tilt in the sagittal direction in the principal ray passage region equals or approximately equals the design value and, yet, the sagittal curvature at the lens centre position differs from the design value.

In the correction processing value of the mirror surface piece of sagittal non-circular shape, in the sagittal section the curved direction of the lens surface is reversed between the lens centre position and the passage position of the principal ray of the scanning light beam.

[Working Example of Correction Processing Method for Mirror Surface Piece]

In this example, when the mirror surface piece of the injection molding die for the first and second imaging lenses 7a and 7b constituting the imaging optical system is corrected, the following procedure is carried out in order to determine the correction processing value.

Step (1): The actual sagittal shape of the first imaging lens (injection molded lens) 7a and the second imaging lens (injection molded lens) 7b is measured.

Furthermore, the first imaging lens 7a and the second imaging lens 7b are placed inside an optical system equivalent to the optical scanning device, and the field curvature and the scan line curve are measured.

Step (2): At least one surface of the surfaces to be corrected is chosen to be formed with a sagittal non-arcuate shape, and the correction processing value of the other sagittal arcuate shape surfaces is set so that the actually measured sagittal shape equals the design value.

Furthermore, the correction processing value of the surface of the sagittal non-arcuate shape is so set as to correct the scan line curve and the sagittal field curvature on the basis of the scan line curve and the sagittal field curvature actually measured on a plurality of photosensitive drums, as well as the sagittal shape.

Step (3): Based on the correction processing value detected by Steps (1) and (2), the correction processing is carried out to the mirror surface piece for forming the injection molded lens.

In this working example, with regard to the sagittal shape as measured at Step (1), all the surfaces of the first and second imaging lenses 7a and 7b were exactly the same as the design value.

Furthermore, there was found a field curvature in the sub-scan direction of an amount 0.9 mm, and the scan line curve amount was as good as 0 µm.

FIG. 4A and FIG. 4B illustrate the results of measurement of the sagittal field curvature and the scan line curve in this working example.

Then, in accordance with Step (2), the correction processing value of the mirror surface piece was determined.

Since from Step (1) the sagittal shape was exactly as designed, no correction processing value was determined with respect to the opposite surfaces of the first imaging lens 7a and the deflector-side lens surface of the second imaging lens 7b.

On the other hand, with regard to the scan-surface-side lens surface of the second imaging lens 7b, in order to correct the field curvature in the sub-scan direction and not to deteriorate the scan line curve, the sagittal non-arcuate shaped surface shown in Table 5 was set as the correction processing value.

Subsequently, in accordance with Step (3) and based on the correction processing value determined at Step (2), the correction processing was carried out to the mirror surface piece for the injection molding of the second imaging lens 7b.

As a result of this, with regard to the imaging lenses to be used in an optical scanning device of the present embodiment, the opposite surfaces of the first imaging lens 7a and the deflector-side lens surface of the second imaging lens 7b were formed with a sagittal arcuate shape exactly as the design value.

On the other hand, the scan-surface side lens surface of the second imaging lens 7b was formed with a sagittal non-arcuate shape shown in Table 5 (i.e., the sagittal non-arcuate shape in which the sagittal curvature at the light ray passage position has a positive power as compared with the sagittal curvature at the sagittal optical axis).

Since in the present embodiment the sagittal shape measured at Step (1) was exactly as designed, no correction processing value was set.

However, if the sagittal shape of an actually injection molded lens as measured is deviated from the design value, the correction processing value may be set so that the sagittal shape of a lens to be practically injection molded equals the design value.

Furthermore, since in the present embodiment the scan line curve was good and only the image plane deviation occurred in the imaging lens, the sagittal non-arcuate shaped surface was set so as to correct the field curvature without changing the scan line curve.

If there is scan line curve in addition to the image plane deviation, on the other hand, the sagittal non-arcuate shape may be set to intentionally shift the sagittal surface tilt from the design value to thereby correct both of the image plane deviation and the scan line curve.

In the present embodiment, the correction processing value of the sagittal non-arcuate shape is so that that a local minimum point of the sagittal curvature is present at the sagittal center in the sagittal section and also that a local maximum point of the sagittal curvature is present inside the light beam passage region. By doing so, the sagittal field curvature having been deviated in the direction apart from the deflecting surface is corrected.

Here, the sign of the sagittal curvature is positive if the sagittal surface has a positive power, and it is negative if the sagittal surface has a negative power.

The present embodiment is not limited to such shape. For example, when the sagittal field curvature being deviated in the direction apart from the deflecting surface is to be corrected, the following procedure may be done.

Namely, the correction processing value of the sagittal non-arcuate shape may be set so that, in the sagittal section, a local maximum point of the sagittal curvature is present at the lens center and also that a local minimum point of the sagittal curvature is present inside the light beam passage region.

With this arrangement, the image plane deviation and the scan line curve can be corrected, and the advantageous effects of the present invention are fully obtainable.

In this embodiment, the value which is obtainable by converting the difference between the sagittal curvature at the passage position of the principal ray of the scanning light beam in the sagittal section, of the correction processing value of the sagittal non-arcuate shape, and the sagittal curvature at the centre position of the lens surface, in terms of the Newton number per 3 mm width, is denoted by N'.

Here, N'>0 is set for all the image heights. By setting the value of N' at the light ray passing position for the image heights Y=−112 to −60 mm and Y=60 to 112 mm, so as to satisfy a relation 0.7<N'<10, the scan line curve and the image plane deviation (field curvature) due to the internal strain (refractive index gradient) can be corrected.

In the conditional expression mentioned above, N' is a value obtainable by converting, in the sagittal section, the difference between the sagittal curvature at the passage position of the principal ray of the scanning light beam and the sagittal curvature at the centre position of the lens surface, in terms of the Newton number with respect to the 3 mm width. Here, the unit of N' is [Newton number/3 mm width] (the Newton number is a value converted with respect to the wavelength λ=587.56 nm).

The present embodiment is not limited to this correction processing value. As long as there is a region satisfying a conditional expression (5) below over the whole region in the main-scan direction in which the light beam passes through the sagittal non-arcuate shaped surface, the advantageous effects of the present invention are fully obtainable.

$$0.7<N'<10 \quad (5)$$

Where the N' of the correction processing value of the sagittal non-arcuate shape is not greater than 0.7 [Newton number/3 mm width] and if the image plane deviation and the scan line curve which should be corrected are larger, the correction amount is insufficient and good imaging performance cannot be attainable.

On the contrary, if N' of the correction processing value of the sagittal non-arcuate shape is set to be not less than 10.0 [Newton number/3 mm width], the following problem will be raised.

Since the amount of local curvature change in the light beam passage region is too large, the correction processing is becomes extremely difficult to accomplish. As a result, a molded lens by which a good spot can be formed on the scan surface is no more obtainable.

In the present embodiment, from such standpoint, the conditional expression (5) is satisfied to thereby correct the scan line curve and the image plane deviation due to the lens internal strain.

Preferably, the conditional expression (5) mentioned above had better be set as follows.

$$1.0<N'<9 \quad (5a)$$

Furthermore, in the present embodiment, the correction processing value of the sagittal non-arcuate shape is so set that, as the spacing from the optical axis increases in the main-scan direction, the difference between the sagittal curvature at the passage position of the principal ray of the scanning light beam in the sagittal section and the sagittal curvature at the centre position of the lens surface increases.

By doing so, the field curvature and the scan line curve are well corrected.

Furthermore, the sagittal non-arcuate shaped surface of the molded lens formed by using a mirror surface piece corrected by the mirror surface piece correction processing method of the present embodiment, has the following features.

Namely, it is a sagittal non-arcuate shaped surface having a feature that the surface tilt in the sagittal direction at the principal ray passage region of the scanning light beam equals the design value and yet the sagittal curvature at the lens centre position differs from the design value.

By setting the optical arrangement in this manner, only the image plane deviation (field curvature) can be well corrected without deteriorating (i.e., adversely influencing) the scan line curve at all.

Furthermore, in the present embodiment, the correction processing value of the sagittal non-arcuate shape is so determined that, in the sagittal section, the curved direction of the lens surface is reversed between the lens centre position and the principal ray passage position of the scanning light beam.

With this arrangement, the sagittal non-arcuate shape of the molded lens is set so that the surface tilt in the sagittal direction at the principal ray passage region equals the design value and yet the sagittal curvature at the lens centre position differs from the design value.

With the structure described above, both of the scan line curve and the image plane deviation are well corrected.

[Embodiment of Image Forming Apparatus]

Figure 12:
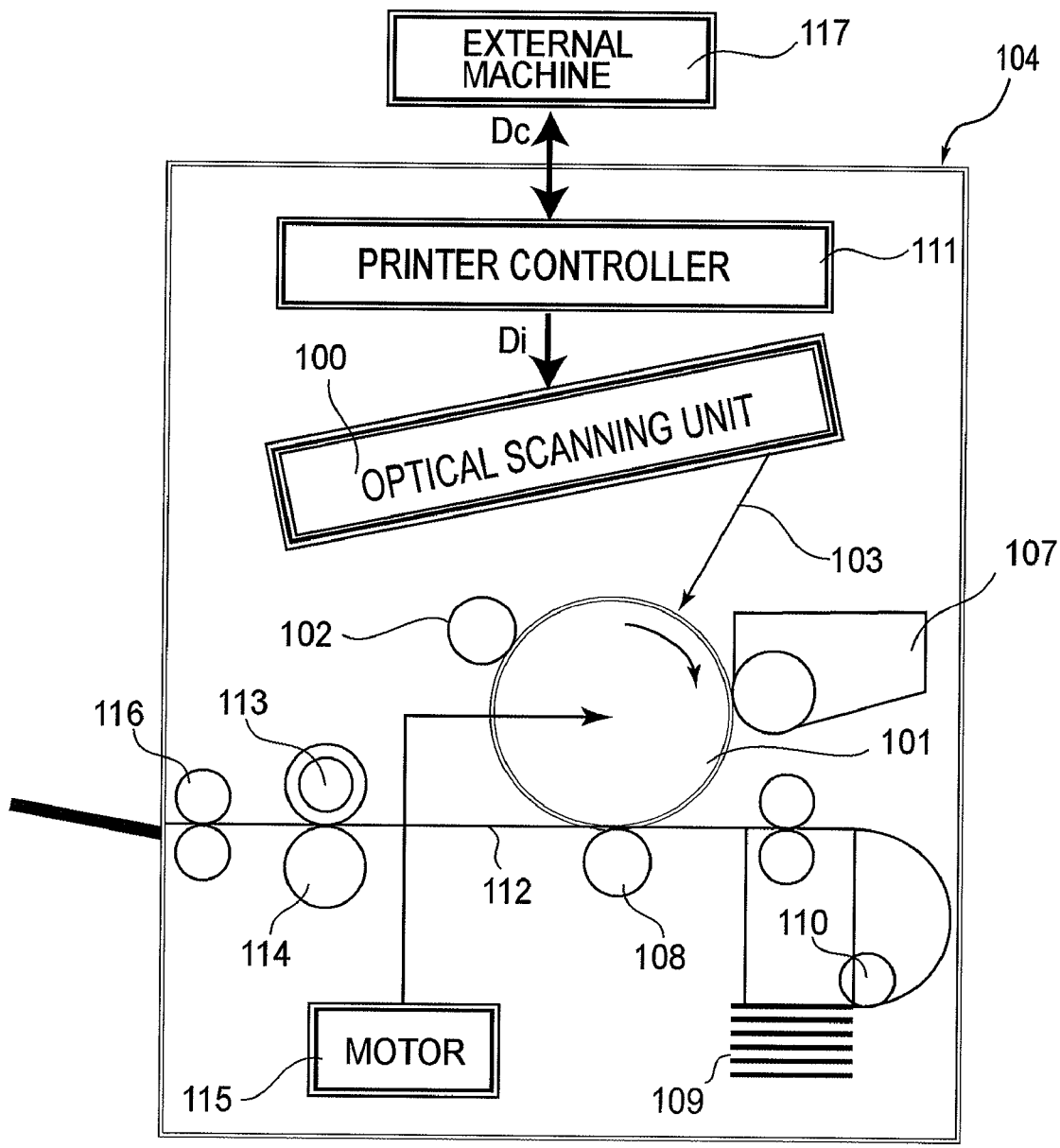
FIG. 12 is a sub-scan sectional view illustrating an image forming apparatus according to an embodiment of the present invention.

FIG. 12 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with the first embodiment described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 12) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 12) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 12, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

[Embodiment of Color Image Forming Apparatus]

Figure 13:
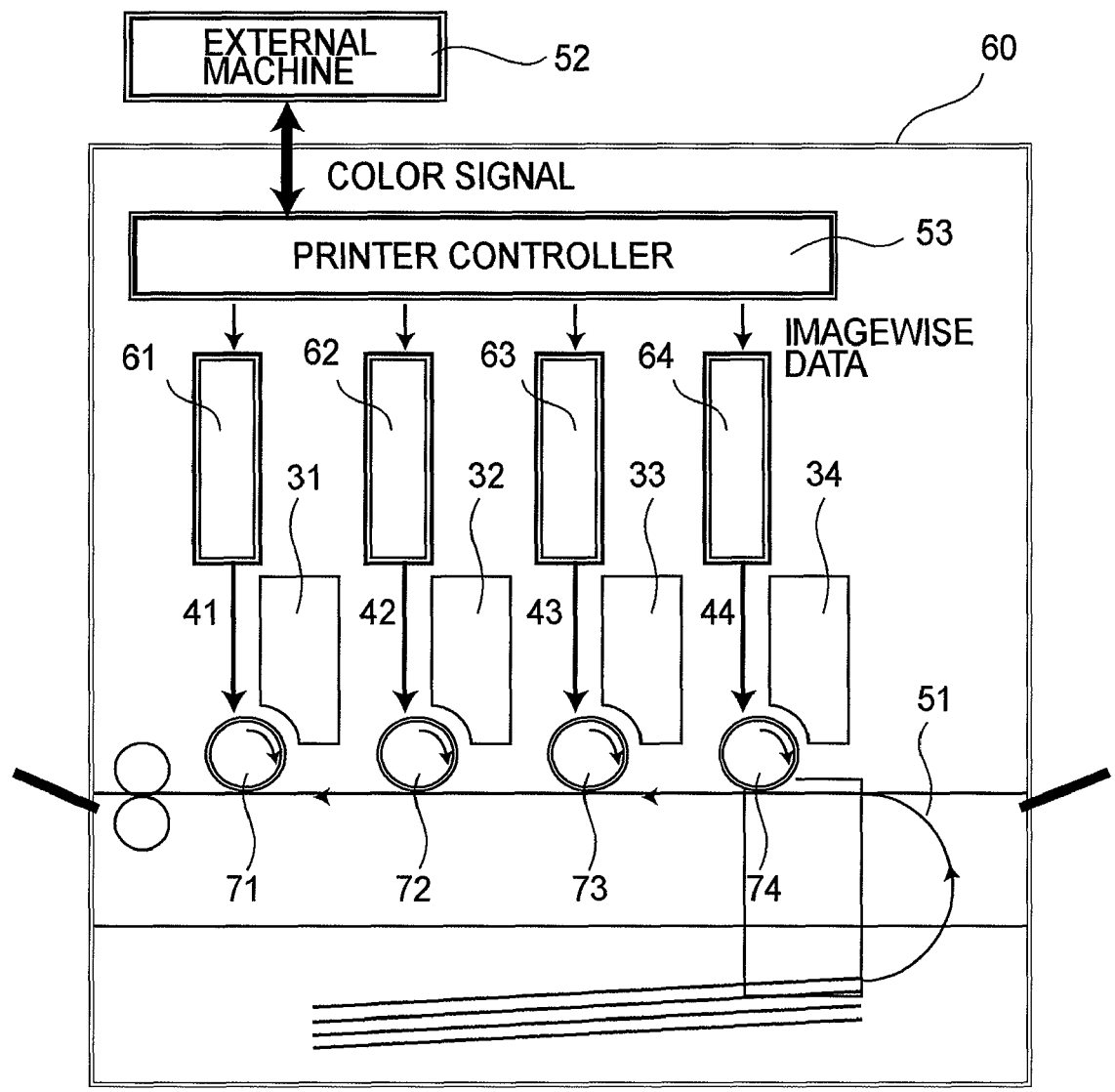
FIG. 13 is a schematic diagram of a main portion of a color image forming apparatus according to an embodiment of the present invention.

FIG. 13 is a schematic view of a main portion of a color image forming apparatus according to an embodiment of the present invention. This embodiment is directed to a tandem type color image forming apparatus in which four optical scanning devices are provided so as to record imagewise data upon the surfaces of corresponding photosensitive drums (image bearing members) in parallel to each other.

In FIG. 13, denoted generally at 60 is a color image forming apparatus, and denoted at 61, 62, 63 and 64 are optical scanning devices having a structure according the first embodiment. Denoted at 71, 72, 73 and 74 are photosensitive drums (image bearing members), and denoted at 31, 32, 33 and 34 are developing devices, respectively. Denoted at 51 is a conveyance belt.

Although not shown in FIG. 13, the image forming apparatus further comprises a transfer device for transferring the toner image developed by the developing device to a transfer material, and a fixing device for fixing the transferred toner image on the transfer sheet.

In FIG. 13, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and B (black).

These imagewise data are inputted into the optical scanning devices 61, 62, 63 and 64, respectively. In response, these optical scanning devices produce light beams 41, 42, 43 and 44 having been modulated in accordance with the associated imagewise data. Through these light beams, the photosensitive surfaces of the photosensitive drums 71, 72, 73 and 74 are scanned in the main-scan direction.

In the color image forming apparatus of this embodiment, four optical scanning devices 61, 62, 63 and 64 are provided and these correspond to colors of C (cyan), M (magenta), Y (yellow) and B (black), respectively. These scanning devices are operable in parallel to each other to record imagewise signals upon the surfaces of the photosensitive drums 71, 72, 73 and 74, respectively, so that a color image can be printed at high speed.

As described, the color image forming apparatus of this embodiment uses four optical scanning devices 61, 62, 63 and 64 to produce latent images for different colors upon the surfaces of corresponding photosensitive drums 71, 72, 73 and 74, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-295346 filed Nov. 14, 2007, for which is hereby incorporated by reference.

What is claimed is:

1. An optical scanning device, comprising:
light source means;
deflecting means;
an input optical system configured to direct a light beam from said light source means onto said deflecting means; and
an imaging optical system configured to image a light beam scanningly deflected by a deflecting surface of said deflecting means, upon a scan surface to be scanned,
wherein, in a sub-scan section, a light beam directed from said input optical system toward the deflecting surface of said deflecting means is incident thereon at a finite angle with respect to a plane which is orthogonal to a rotational axis of said deflecting means,
wherein said imaging optical system includes at least one molded imaging lens,
wherein a shape within a sagittal section of at least one lens surface, of lens surfaces of said at least one imaging lens, is non-arcuate, and a sagittal curvature in a light beam passage region has an extreme value, and
wherein, when N denotes a value which is obtainable by converting a difference between the sagittal curvature at a passage position of a principal ray of a light beam and the sagittal curvature at a central position of the lens surface, into a Newton number with respect to a 3 mm width, within the sagittal section, the shape of said at least one lens surface of said imaging lens in the sagittal section satisfies a condition $0.7 < N < 10$ over the whole region in a main-scan direction in which the light beam passes.

2. An optical scanning device according to claim 1, wherein a shape within the sagittal section of at least one surface of the lens surfaces of said imaging lens is such that a local minimum point of the sagittal curvature is located at a lens center, while a local maximum point of the sagittal curvature is located inside the light beam passage region.

3. An optical scanning device according to claim 1, wherein a shape within the sagittal section of said at least one lens surface of said imaging lens is such that a local maximum point of the sagittal curvature is located at a lens center, while a local minimum point of the sagittal curvature is located inside the light beam passage region.

4. An optical scanning device according to claim 1, wherein a shape of said at least one lens surface of said imaging lens in the sagittal section is such that the difference between the sagittal curvature at a passage position of a principal ray of the light beam and the sagittal curvature at a central position of the lens surface increases with a distance in a main-scan direction from an optical axis.

5. An optical scanning device according to claim 1, wherein a shape of said at least one lens surface of said imaging lens in the sagittal section is such that a central position of the lens surface and a passage position of a principal ray of the light beam are deviated from each other.

6. An optical scanning device according to claim 1, wherein said at least one lens surface of said imaging lens is a lens surface closest to the scan surface.

7. An optical scanning device according to claim 1, wherein said at least one lens surface of said imaging lens is a lens surface having a largest refracting power in the sub-scan section.

8. An optical scanning device according to claim 1, wherein a shape of said at least one lens surface of said imaging lens within the sagittal section has a positive refracting power or a negative refracting power over the whole region in the sagittal section.

9. An image forming apparatus, comprising:
an optical scanning device as recited in claim 1;
a photosensitive member disposed at the scan surface to be scanned;
a developing device for developing an electrostatic latent image formed on said photosensitive member with a light beam scanningly deflected by said optical scanning device, to produce a toner image;
a transferring device for transferring the developed toner image onto a transfer material; and
a fixing device for fixing the transferred toner image, on the transfer material.

10. An image forming apparatus, comprising:
an optical scanning device as recited in claim 1; and
a printer controller for converting code data supplied from an outside machine into an imagewise signal and for inputting the imagewise signal into said optical scanning device.

* * * * *